US006636865B2

(12) United States Patent
Ahmadi

(10) Patent No.: US 6,636,865 B2
(45) Date of Patent: *Oct. 21, 2003

(54) METHOD AND APPARATUS FOR BINARY-ORIENTED SET SEQUENCING

(75) Inventor: Babak Ahmadi, West Vancouver (CA)

(73) Assignee: UFIL Unified Data Technologies, Ltd., Vancouver ( * ) Notice: Subject to any disclaimer, the term of this patent is extended or adjusted under 35 U.S.C. 154(b) by 15 days.

This patent is subject to a terminal disclaimer.

(21) Appl. No.: 09/952,270

(22) Filed: Sep. 10, 2001

(65) Prior Publication Data
US 2002/0032686 A1 Mar. 14, 2002

Related U.S. Application Data

(63) Continuation of application No. 09/477,078, filed on Jan. 3, 2000, now Pat. No. 6,470,351, which is a continuation of application No. 09/215,381, filed on Dec. 18, 1998, now Pat. No. 6,092,077, which is a continuation of application No. 08/924,706, filed on Sep. 5, 1997, now abandoned.

(51) Int. Cl.[7] .............................................. G06F 17/30
(52) U.S. Cl. ......................... 707/102; 707/1; 707/100; 707/103 R
(58) Field of Search ............................ 707/102, 103 R, 707/100, 1

(56) References Cited

U.S. PATENT DOCUMENTS

| 4,791,561 | A | 12/1988 | Huber | 707/1 |
|---|---|---|---|---|
| 4,805,099 | A | 2/1989 | Huber | 707/102 |
| 5,093,782 | A | 3/1992 | Muraski et al. | 707/104.1 |
| 5,129,083 | A | 7/1992 | Cutler et al. | 707/103 R |
| 5,133,070 | A | 7/1992 | Barker et al. | 707/513 |
| 5,241,645 | A | 8/1993 | Cimral et al. | 395/500.23 |
| 5,418,942 | A | 5/1995 | Krawchuk et al. | 707/3 |
| 5,454,101 | A | 9/1995 | Mackay et al. | 707/3 |
| 5,463,774 | A | 10/1995 | Jenness | 716/600 |
| 5,504,892 | A | 4/1996 | Atsatt et al. | 707/103 R |
| 5,535,383 | A | 7/1996 | Gower | 707/103 R |

(List continued on next page.)

OTHER PUBLICATIONS

Agrawal, R. et al., "An Interval Classifier for Database Mining Applications", *Proceedings of the 18th International Conference on Very Large Data Bases,* Vancouver, Canada, pp. 56073 (Aug. 23–27, 1992).

(List continued on next page.)

Primary Examiner—Charles Rones
(74) Attorney, Agent, or Firm—Merchant & Gould

(57) ABSTRACT

A computer-implemented method and apparatus for information organization, wherein atomic information can be both static and dynamic, but the compound information (e.g., associations, groupings, sets, etc.) of such atoms always remain dynamic. Unless otherwise directed, a compound information entity is always dynamically determined and generated. This determination is based on the processing of a defined condition, wherein all atoms qualifying the condition are included in the compound. This dynamic determination eliminates the need to "update" the compound, when atoms and/or compounds common to two or more compounds are changed. Further, each information compound can be dynamically generated based on an existing definition for that compound.

86 Claims, 36 Drawing Sheets

Sample Record Definition "A" 3402

```
RECORD "A"
    "B"   STRING 50
    "C"   32-BIT UNSIGNED NUMBER
    "D"   10-BYTE PACKED ARRAY
    "E"   RECORD "Z"
```

Sample Record Definition "Z" 3404

```
RECORD "Z"
    "W"   16-BIT UNSIGNED NUMBER
    "X"   STRING 16
```

EDS Representation Of Record "A" 3406

| SUBJECT | ATTRIBUTE | BOND | SEQ. |
|---|---|---|---|
| A | B | RECORD ELEMENT | 0 |
| A | C | RECORD ELEMENT | 1 |
| A | D | RECORD ELEMENT | 2 |
| A | E | RECORD ELEMENT | 3 |
| B | STRING | DATA TYPE | NULL |
| B | "50" | SIZE | NULL |
| C | U32B | DATA TYPE | NULL |
| C | "4" | SIZE | NULL |
| D | PACKA | DATA TYPE | NULL |
| D | "10" | SIZE | NULL |
| E | Z | DATA TYPE | NULL |
| E | Z | SIZE OF | NULL |

EDS Representation Of Record "Z" 3408

| SUBJECT | ATTRIBUTE | BOND | SEQ. |
|---|---|---|---|
| Z | W | RECORD ELEMENT | 0 |
| Z | X | RECORD ELEMENT | 1 |
| W | U16B | DATA TYPE | NULL |
| W | "2" | SIZE | NULL |
| X | STRING | DATA TYPE | NULL |
| X | "16" | SIZE | NULL |

U.S. PATENT DOCUMENTS

| | | | |
|---|---|---|---|
| 5,535,386 A | 7/1996 | Wang | 707/203 |
| 5,548,749 A | 8/1996 | Kroenke et al. | 707/102 |
| 5,551,028 A | 8/1996 | Voll et al. | 707/103 R |
| 5,608,900 A | 3/1997 | Dockter et al. | 707/102 |
| 5,652,880 A | 7/1997 | Seagraves | 707/103 |
| 5,684,985 A | 11/1997 | Ahmadi | 707/100 |
| 5,692,184 A | 11/1997 | Ardoin et al. | 707/103 |
| 5,729,738 A | 3/1998 | Watanabe et al. | 707/103 |
| 5,758,344 A | 5/1998 | Prasad et al. | 707/10 |
| 5,781,906 A | 7/1998 | Aggarwal et al. | 707/102 |
| 5,787,432 A | 7/1998 | LeTourneau | 707/101 |
| 5,838,965 A | 11/1998 | Kavanagh et al. | 707/103 |
| 5,905,987 A | 5/1999 | Shutt et al. | 707/10 |
| 5,924,094 A | 7/1999 | Sutter | 707/102 |
| 5,960,437 A | 9/1999 | Krawchuk et al. | 707/103 |
| 5,991,765 A | 11/1999 | Vethe | 707/5 |
| 5,999,926 A | 12/1999 | Suciu | 707/100 |
| 6,009,434 A | 12/1999 | Chui et al. | 707/100 |
| 6,018,741 A | 1/2000 | Howland et al. | 707/102 |
| 6,052,686 A | 4/2000 | Fernandez et al. | 707/100 |
| 6,052,688 A | 4/2000 | Thorsen | 707/100 |
| 6,052,691 A | 4/2000 | Ardoin et al. | 707/102 |
| 6,092,064 A | 7/2000 | Aggarwal et al. | 707/6 |
| 6,092,077 A | 7/2000 | Ahmadi | 707/102 |
| 6,154,739 A | 11/2000 | Wrobel | 707/6 |
| 6,189,012 B1 | 2/2001 | Mital et al. | 707/103 |
| 6,189,138 B1 | 2/2001 | Fowlow et al. | 717/1 |
| 6,208,987 B1 | 3/2001 | Nihei | 707/3 |
| 6,208,989 B1 | 3/2001 | Dockter et al. | 707/5 |
| 6,219,662 B1 | 4/2001 | Fuh et al. | 707/3 |
| 6,240,407 B1 | 5/2001 | Chang et al. | 707/2 |
| 6,247,016 B1 | 6/2001 | Rastogi et al. | 707/101 |
| 6,249,788 B1 | 6/2001 | Ronström | 707/101 |
| 6,253,195 B1 | 6/2001 | Hudis et al. | 707/2 |
| 6,278,992 B1 | 8/2001 | Curtis et al. | 707/3 |
| 6,278,997 B1 | 8/2001 | Agrawal et al. | 707/6 |
| 6,279,016 B1 | 8/2001 | De Vorchik et al. | 707/526 |
| 6,289,354 B1 | 9/2001 | Aggarwal et al. | 707/104 |
| 6,292,804 B1 | 9/2001 | Ardoin et al. | 707/102 |
| 6,311,179 B1 | 10/2001 | Agarwal et al. | 707/3 |
| 6,317,749 B1 | 11/2001 | Ghatate | 707/103 |
| 6,470,351 B1 * | 10/2002 | Ahmadi | 707/102 |

OTHER PUBLICATIONS

Agrawal, R. et al., "Mining Association Rules between Sets of Items in Large Databases", *Proceedings of the 1993 ACM SIGMOD International Conference on Management of Data,* Washington, D.C., pp. 207216 (May 26–28, 1993).

Agrawal, R. et al., "Database Mining: A Performance Perspective", *IEEE Transactions on Software Engineering,* vol. 5, No. 6, pp. 914–925 (Dec. 1993).

Batory, D.S. et al., "GENESIS: An Extensible Database Management System", *IEEE Transactions on Software Engineering,* vol. 14, No. 11, pp. 1171–1730 (Nov. 1988).

Beckman, N. et al., "The R$^+$–tree: An Efficient and Robust Access Method for Points and Rectangles", *Proceedings of the 1990 ACM SIGMOD International Conference on Management of Data,* Atlantic City, NJ, pp. 322–331, (May 23–25, 1990).

Belkin, N. et al., "Information Filtering and Information Retrieval: Two Sides of the Same Coin?", *Communications of the ACM,* vol. 35, No. 12, pp. 20–38 (Dec. 1992).

Bhide, A. et al., "A Comparison of Two Approaches to Build Reliable Distributed File Servers", *11th International Conference on Distributed Computing Systems,* Arlington, Texas, pp. 616623 (May 20–24, 1991).

Blaha, M. et al., "Relational Database Design Using an Object–oriented Methodology", *Communications of the ACM,* vol. .31, No. 4, pp. 414–427 (Apr. 1988).

Blizard, W., "Multiset Theory", *Notre Dame Journal of Formal Logic* vol. 30, No. 1, pp. 36–66 (Winter 1989).

Brachman, R. et al., "An Overview of the KLONE Knowledge Representation System", *Cognitive Science,* vol. 9, No. 2, pp. 171–216 (Apr.–Jun. 1985).

Codd, E.F., "Extending the Database Relational Model to Capture More Meaning", *ACM Transactions on Database Systems* vol. 4, No. 4, pp. 397–434 (Dec. 1979).

Conklin, J., "Hypertext: An Introduction and Survey", *Computer,* vol. 20, No. 9, pp. 1741 (Sep. 1987).

Consens, M. et al., "Optimizing Queries on Files", *SIGMOD Record. Proceedings of the 1984 ACM SIGMOD International Conference on Management of Data,* Minneapolis, Minnesota, vol. 23, No. 2, pp. 301–312 (Jun. 1994).

Decorte, G. et al., "An Object–Oriented Model for Capturing Data Semantics", *Eighth International Conference on Data Engineering,* Tempe, Arizona, pp. 126–135 (Feb. 2–3, 1992).

Dennes, A., "Stylizing Long Documents? FrameMaker 4.0 is for you", *P.C. Computing,* pp. 16, 84 (Oct. 1993).

Drakopoulos, E. et al., "Performance Analysis of Client–Server Storage Systems", *IEEE Transactions on Computers,* vol. 41, No. 11, pp. 1442–1452 (Nov. 1992).

Edwards, D. et al., "Exploiting Read–Mostly Workloads in the FileNet System", *Proceedings of the Twelfth ACM Symposium on Operating Systems Principles,* Litchfield Park, Arizona, pp. 5870 (Dec. 3–6, 1989).

Fisher, D., "Knowledge Acquisition Via International Conceptual Clustering", *Machine Learning* vol. 2, No. 2, pp. 139–172 (1987).

Hammer, M. et al., "Database Description with SDM: A Semantic Database Model", *ACM Transactions on Database Systems,* vol. 6, No. 3, pp. 351–386 (Sep. 1981).

Hardwick, M. et al., "Using a Relational Database as an index to a Distributed Object Database in Engineering Design Systems", *Second International Conference on Data and Knowledge Systems for Manufacturing and Engineering,* Gaithersburg, MD, pp. 4–11, (Oct. 16–18, 1989).

Hurley, R.T. et al., "Limited Effects of Finite Storage on a Beneficial File Migration Policy", *Proceedings 19th Conference on Local Computer Networks,* Minneapolis, Minnesota, pp. 432–439 (Oct. 2–4, 1994).

Kawabe, S. et al., "A Framework for 3D Modeling: Constraint–Based Description and Non–Manifold Geometric Modeling", *Organization of Engineering Knowledge for Product Modelling in Computer Integrated Manufacturing,* Aichi, Japan, pp. 325–357 (Oct. 2–5, 1988).

Keim, D. et al., "Object–Oriented Querying of Existing Relational Databases", *Database and Expert Systems Applications. 4th International Conference, DEXA '93,* Prague, Czech Republic, pp. 325–335 (Sep. 6–8, 1993).

Kim, W. et al., "Operations and Implementation of Complex Objects", *IEEE Transactions on Software Engineering,* vol. 14, No. 7, pp. 985–996 (Jul. 1988).

Kroenke, D., "Developing Object–Oriented Database Applications on Microcomputers", *The Second International Conference on Computers and Applications,* Beijing (Peking), People's Republic of China, pp. 70–77 (Jun. 23–27, 1987).

Krute, S., "To the MACS. A Few Things that Work, Something That Doesn't, and a Little HyperTalking", *Dr. Dobb's Journal of Software Tools for the Professional Programmer,* pp. 106–116 (Apr. 1988).

Lejter, M. et al., "Support for Maintaining Object–Oriented Programs", *IEEE Transactions on Software Engineering,* vol. 18, No. 12, pp. 1045–1052 (Dec. 1992).

Lynch, C. et al., "Extended User–Defined Indexing with Application to Textual Databases", *Proceedings of the Fourteenth International Conference on Very Large Data Bases,* Los Angeles, California, pp. 306–317 (Aug. 29–Sep. 1, 1988).

McClanahan, D., "Database Design: Relational Rules", *DEMS,* vol. 4, No. 12, pp. 54–58 (Nov. 1991).

McClanahan, D., Conceptual Design, *DBMS,* vol. 5, No. 1, pp. 66–70, 81 (Jan. 1992).

McHugh, J. et al., "Multilevel Security Issues in Distributed Database Management Systems", *Computers & Security,* vol. 7, No. 4, pp. 387–396 (Aug. 1988).

McHugh, J. et al., "Lore: A Database Management System for Semistructured Data", *SIGMOD Record,* vol. 26, No. 3, pp. 54–66 (Sep. 1997).

Ng, R. et al., "Efficient and Effective Clustering Methods for Spatial Data Mining", *20th VLDB Conference, Proceedings of the 20th International Conference on Very Large Data Bases* Santiago, Chile, pp. 144–155 (Sep. 12–15, 1994).

Ouksel, M. et al., "Multidimensional B–Trees: Analysis of Dynamic Behavior", *BIT,* vol. 21, pp. 401–418 (1981).

Quinlan, J.R., "Simplifying Decision Trees", *International Journal of Man–Machine Studies* vol. 27, No. 3, pp. 221–234 (Sep. 1987).

Quinlan, J. et al., "Inferring Decision Trees Using the Minimum Description Length Principle", *Information and Computation,* vol. 80, No. 3, pp. 227–248 (Mar. 1989).

Rao, H. et al., "Accessing Files in an Internet: The Jade File System", *IEEE Transactions on Software Engineering,* vol. 19, No. 6. pp. 613–624 (Jun. 1993).

Richard, D., "All Arithmetical Sets of Powers of Primes are First–Order Definable in Terms of the Successor Function and The Coprimeness Predicate", *Discrete Mathematics,* vol. 53, pp. 221–247 (1985).

Rinaldi, D., "Driving New Pilings", *Client/Server Computing Special Edition,* vol. 12, No. 7, pp. 4, 58 (May 1992).

Sellis, T. et al., "The $R^+$–Tree: A Dynamic Index for Multi–Dimensional Objects", *International Conference on Very Large Data Bases. Proceedings of the Thirteenth International Conference on Very Large Data Bases,* Brighton, England, pp. 507–518 (Sep. 1–4, 1987).

Sibson, R., "SLINK: An Optimally Efficient Algorithm for the Single–Link Cluster Method", *The Computer Journal,* vol. 16, No. 1, pp. 30–34 (Feb. 1973).

Sirrine, S., "FrameMaker 4 Builds on Solid Set of Tools", *Infoworld,* pp. 58–59 (Dec. 27, 1993/Jan. 3, 1994).

Smyth, P. et al., "An Information Theoretic Approach to Rule Induction from Databases", *IEEE Transactions on Knowledge and Data Engineering,* vol. 4, No. 4., pp. 301–316 (Aug. 1992).

Summers, P. et al., "AML: A Programming Language for Automation", *The IEEE Computer Society's Fifth International Computer Software & Applications Conference,* Chicago, Illinois, pp. 154–155 (Nov. 16–20, 1981).

Taylor, R. et al., "An Integrated Robot System Architecture", *Proceedings of the IEEE,* vol. 71, No. 7, pp. 842–856 (Jul. 1983).

Wells, D. et al., "Architecture of an Open Object–Oriented Database Management System", *Computer,* vol. 25, No. 10, pp. 74–82 (Oct. 1992).

Woods, W. et al., "The KL–One Family", *Computers Math. Applic.,* vol. 23, No. 2–5, pp. 133–177 (Jan.–Mar. 1992).

Yankelovich, N. et al., "Reading and Writing the Electronic Book", *Computer,* vol. 18, No. 10, pp. 15–30 (Oct. 1985).

Yunkelovich, N. et al., "Intermedia: The Concept and the Construction of a Seamless Information Environment", *Computer,* vol. 21, No. 1, pp. 81–96 (Jan. 1988).

Yaseen, R. et al., "An Extensible Kernal Object Management System", *OOPSLA '91 Conference on Object–Oriented Programming Systems, Languages, and Applications,* vol. 26, No. 11, pp. 247263 (Nov. 1991).

Yi, K. et al., "Automatic Generation and Management of Interprocedural Program Analyses", *Conference Record of the Twentieth Annual ACM SIGPLAN–SIGACT Symposium on Principles of Programming Languages,* Charleston, South Carolina, pp. 246–259 (Jan. 10–13, 1993).

Yu, P. et al., "Dynamic Transaction Routing in Distributed Database Systems", *IEEE Transaction on Software Engineering,* vol. 14, No. 9, pp. 1307–1318 (Sep. 1988).

\* cited by examiner

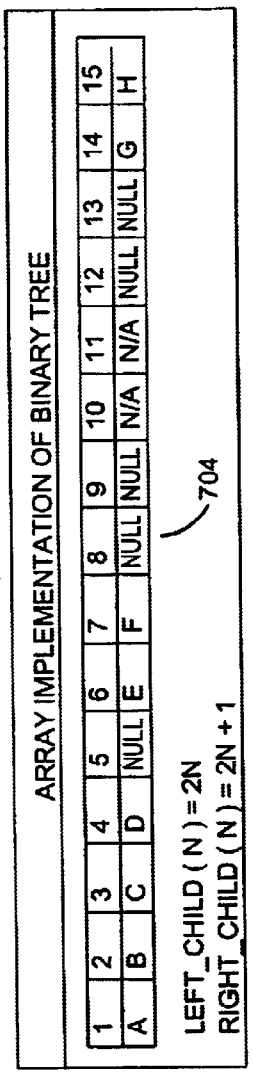
FIG. 7B
ARRAY IMPLEMENTATION OF BINARY TREE
LEFT_CHILD (N) = 2N
RIGHT_CHILD (N) = 2N + 1
FIG. 7C
RECORD IMPLEMENTATION OF BINARY TREE
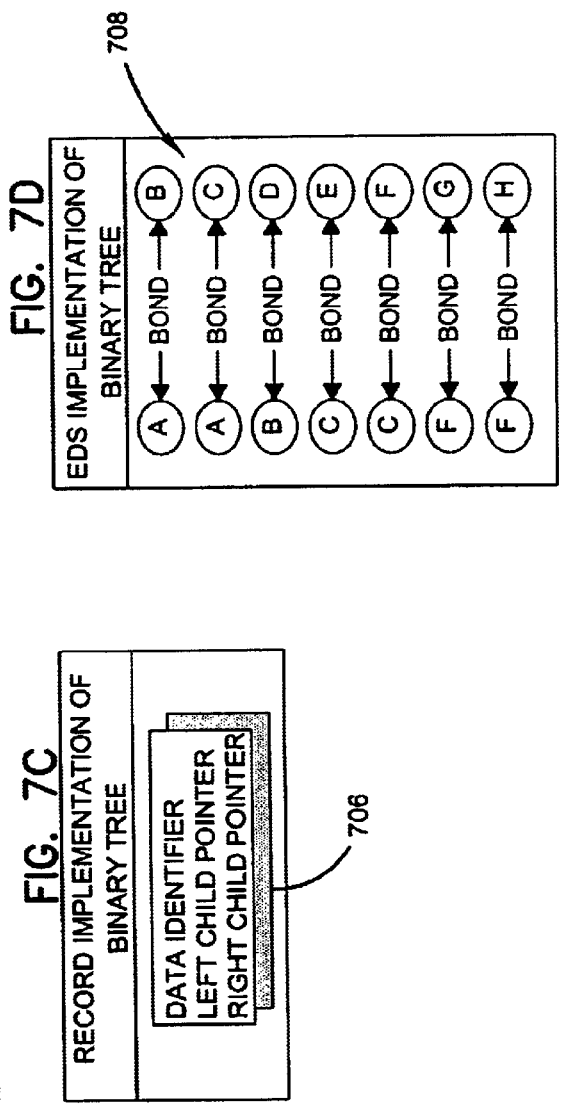
FIG. 7D
EDS IMPLEMENTATION OF BINARY TREE
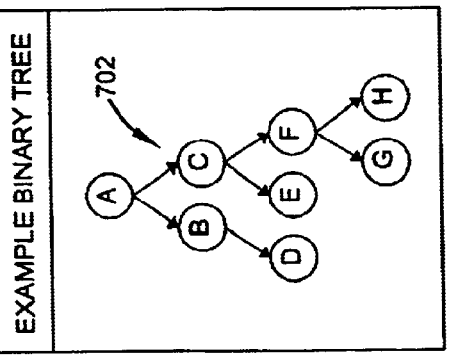
FIG. 7A
EXAMPLE BINARY TREE
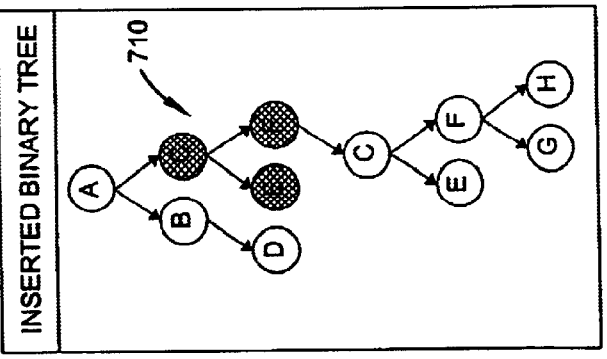
FIG. 7E
INSERTED BINARY TREE

FIG. 10

| | |
|---|---|
| UNIVERSAL ENTITY IDENTIFIER (UEI) | |
| SITE OWNER IDENTIFIER (SOI) | 4B |
| SITE ENTITY IDENTIFIER (SEI) | 4B |
| DATA TYPE IDENTIFIER (DTI) | 4B |

FIG. 11

| ENDO-DYNAMIC INFORMATION NODE (EDIN) | | |
|---|---|---|
| SUBJECT | [UEI] | 8B |
| ATTRIBUTE | [UEI] | 8B |
| BOND | [UEI] | 8B |
| SEQUENCE | | 4B |

FIG. 12

| SUBJECT | ATTRIBUTE | BOND | SEQUENCE | MEANING OF COMBINATION |
|---|---|---|---|---|
| 1 | VALUE | VALUE | ANY | ANY | REGULAR ENDO-DYNAMIC ELEMENT |
| 2 | VALUE | NULL | ANY | ANY | NULLIFIED ENDO-DYNAMIC ELEMENT |
| 3 | NULL | VALUE | ANY | ANY | ILLEGAL COMBINATION |
| 4 | NULL | NULL | ANY | ANY | ILLEGAL COMBINATION |

| BOND INFORMATION RECORD | | (BIR) |
|---|---|---|
| BOND | [UEI] | 8B |
| FLAGS | | 4B |
| PROCESS | [UEI] | 8B |

FIG. 15

| BOND FLAGS | | |
|---|---|---|
| BIT | 31 | ACTIVE/PASSIVE |
| | 30 | OPERATOR |
| | 29 | CALL |
| | 28 | SPAWN |
| | 27 | PARAMETER |
| | 26 | USER/NATIVE |
| | 00-25 | NOT USED YET |

FIG. 16

| BOND ORGANIZATION RECORD (BOR) | | |
|---|---|---|
| SELF BOND | [UEI] | 8B |
| RELATED BOND | [UEI] | 8B |

FIG. 18

| SUBJECT | ATTRIBUTE | BOND | SEQ. |
|---|---|---|---|
| CMND LINE-M | PARAMETER-1 | XXX PARAMETER | 0 |
| | | ••• | |
| CMND LINE-M | PARAMETER-N | XXX PARAMETER | (N-1) |
| CMND LINE-M | XXX | ACTIVE XXX BOND | N |

1802 → SUBJECT column
1804 → BOND column

FIG. 19

| SUBJECT | ATTRIBUTE | BOND | SEQ. | |
|---|---|---|---|---|
| "A" | "B" | SOME BOND | N/A | STATEMENT ABOUT "A" |
| "A" | "C" | SOME BOND | N/A | |
| "A" | "D" | SOME BOND | N/A | |
| "A" | "E" | SOME BOND | N/A | |
| "B" | "F" | SOME BOND | N/A | STATEMENT ABOUT "B" |
| "B" | "G" | SOME BOND | N/A | |
| "B" | "H" | SOME BOND | N/A | |

| EXPANDABLE TABLE RECORD (ETR) | | |
|---|---|---|
| KEY | [UEI] | 8B |
| FLAGS | | 1B |
| ETB SIZE | | 4B |
| ETB CHECKSUM | | 4B |
| ETB FILE ADDRESS | | 8B |

FIG. 22

| EXPANDABLE TABLE ARRAY HEADER (ETAH) | |
|---|---|
| FLAGS | 1B |
| SELF ETS                    [UEI] | 8B |
| ETA SIZE         (NUMBER OF ETR'S) | 4B |
| ETA CHECKSUM | 4B |
| ETC SIZE | 4B |
| ETC CHECKSUM | 4B |
| ETA MEMORY ADDRESS | 8B |
| ETC MEMORY ADDRESS | 8B |
| ETC BUFFER SIZE | 4B |
| CURRENT STARTING ETR | 8B |
| CURRENT LAST ETR | 8B |

FIG. 23

| INFOFRAME CONTROL RECORD (IFCR) | | |
|---|---|---|
| LOCAL NAME | [UEI] | 8B |
| FLAGS | | 4B |
| SOI | | 3B |
| NEXT SEI | | 4B |
| MODIFIERS | | XXB |

| SUBJECT | ATTRIBUTE | BOND | SEQ. |
|---|---|---|---|
| DIL-UEI | PARAMETER-1 | INFOBASE PARAMETER | 0 |
| DIL-UEI | PARAMETER-2 | INFOBASE PARAMETER | 1 |
| DIL-UEI | PARAMETER-3 | INFOBASE PARAMETER | 2 |
| DIL-UEI | INFOBASE-1 | ACTIVATE INFOBASE | 3 |
| DIL-UEI | INFOBASE-2 | ACTIVATE INFOBASE | 4 |
| DIL-UEI | PARAMETER-1 | INFOBASE PARAMETER | 5 |
| DIL-UEI | INFOBASE-3 | ACTIVATE INFOBASE | 6 |

| INFOBASE DEFINITION RECORD (IBDR) | | |
|---|---|---|
| FLAGS | | 4B |
| SELF | [UEI] | 8B |
| IMAGE | [UEI] | 8B |

FIG. 26

| SET DEFINITION RECORD (SDR) | | |
|---|---|---|
| SELF IDENTIFIER | [UEI] | 8B |
| GENERATION PROCESS | [UEI] | 8B |
| FLAGS | | 2B |
| LAST GENERATION | | 4B |
| EDS SIZE | | 4B |
| MEMORY ADDRESS | | 8-16B |

FIG. 27

| MODULE DEFINITION RECORD (MDR) | | |
|---|---|---|
| FLAGS | | 4B |
| SELF | [UEI] | 8B |
| IMAGE | [UEI] | 8B |

FIG. 29

Contents of EDS generated for an SDE (2902):

| SUBJECT | ATTRIBUTE | BOND | SEQ. | |
|---|---|---|---|---|
| SDE-UEI | MODULE-N | OPERATOR PARAMETER | 0 | ⎫ SIDE-UNIT-1 IN FIG. 16 |
| SDE-UEI | W:X | OPERATOR PARAMETER | 1 | |
| SDE-UEI | RES-1 | OPERATOR PARAMETER | 2 | |
| SDE-UEI | SUB | EXECUTE OPERATOR | 3 | ⎭ |
| SDE-UEI | MODULE-N | OPERATOR PARAMETER | 4 | ⎫ SIDE-UNIT-2 IN FIG. 16 |
| SDE-UEI | A:B | OPERATOR PARAMETER | 5 | |
| SDE-UEI | RES-2 | OPERATOR PARAMETER | 6 | |
| SDE-UEI | ATT | EXECUTE OPERATOR | 7 | ⎭ |
| SDE-UEI | RES-1 | OPERATOR PARAMETER | 8 | ⎫ SIDE-UNIT-3 IN FIG. 16 |
| SDE-UEI | RES-3 | OPERATOR PARAMETER | 9 | |
| SDE-UEI | MY_EDS | OPERATOR PARAMETER | 10 | |
| SDE-UEI | INTERSECT | EXECUTE OPERATOR | 11 | ⎭ |

FIG. 30

| OPERATOR INFORMATION RECORD (OIR) | | |
|---|---|---|
| OPERATOR | [UEI] | 8B |
| NUMBER OF PARAMETERS | | 4B |
| ENDO-DYNAMIC LIBRARY | [UEI] | 8B |
| CALLING ADDRESS | | .8-16B |

FIG. 31

| PARAMETER DEFINITION RECORD (PDR) | | |
|---|---|---|
| FLAGS | | 1B |
| DATA TYPE | | 4B |
| DATA SIZE | | 4B |
| TYPE IMAGE | [UEI] | 8B |
| DEFAULT VALUE | [UEI] | 8B |

FIG. 35

| CODE LINE ID | LINE LABEL | CODE LINE |
|---|---|---|
| | | PROGRAM CCOPY ( SFILE, TFILE ) |
| | | PARAMETERS: |
| L1 | | DCL SFILE OF TYPE STRING[128] |
| L2 | | DCL TFILE OF TYPE STRING[128] |
| | | VARIABLES: |
| L3 | | DCL SDATE OF TYPE DATE |
| L4 | | DCL TDATE OF TYPE DATE |
| L5 | | GET_DATE ( SFILE, SDATE ) |
| L6 | | GET_DATE ( TFILE, TDATE ) |
| L7 | | JMPG ( SDATE, TDATE, "SKIP_IT" ) |
| L8 | | COPY ( TFILE, SFILE ) |
| L9 | SKIP_IT: | END PROGRAM CCOPY |

| SUBJECT | ATTRIBUTE | BOND | SEQ. | |
|---------|-----------|------|------|---|
| CCOPY | SFILE | OPERATOR PARAMETER | 0 | CODE LINE:L1 |
| CCOPY | STRING | OPERATOR PARAMETER | 1 | |
| CCOPY | "128" | OPERATOR PARAMETER | 2 | |
| CCOPY | GET_PARM | EXECUTE OPERATOR | 3 | |
| CCOPY | TFILE | OPERATOR PARAMETER | 4 | CODE LINE:L2 |
| CCOPY | STRING | OPERATOR PARAMETER | 5 | |
| CCOPY | "128" | OPERATOR PARAMETER | 6 | |
| CCOPY | GET_PARM | EXECUTE OPERATOR | 7 | |
| CCOPY | SDATE | OPERATOR PARAMETER | 8 | CODE LINE:L3 |
| CCOPY | DATE | OPERATOR PARAMETER | 9 | |
| CCOPY | "4" | OPERATOR PARAMETER | 10 | |
| CCOPY | ALLOC_VAR | EXECUTE OPERATOR | 11 | |
| CCOPY | TDATE | OPERATOR PARAMETER | 12 | CODE LINE:L4 |
| CCOPY | DATE | OPERATOR PARAMETER | 13 | |
| CCOPY | "4" | OPERATOR PARAMETER | 14 | |
| CCOPY | ALLOC_VAR | EXECUTE OPERATOR | 15 | |
| CCOPY | SFILE | OPERATOR PARAMETER | 16 | CODE LINE:L5 |
| CCOPY | SDATE | OPERATOR PARAMETER | 17 | |
| CCOPY | GET_DATE | EXECUTE OPERATOR | 18 | |
| CCOPY | TFILE | OPERATOR PARAMETER | 19 | CODE LINE:L6 |
| CCOPY | TDATE | OPERATOR PARAMETER | 20 | |
| CCOPY | GET_DATE | EXECUTE OPERATOR | 21 | |
| CCOPY | SDATE | OPERATOR PARAMETER | 22 | CODE LINE:L7 |
| CCOPY | TDATE | OPERATOR PARAMETER | 23 | |
| CCOPY | "SKIP_IT" | OPERATOR PARAMETER | 24 | |
| CCOPY | JMPG | EXECUTE OPERATOR | 25 | |
| CCOPY | TFILE | OPERATOR PARAMETER | 26 | CODE LINE:L8 |
| CCOPY | SFILE | OPERATOR PARAMETER | 27 | |
| CCOPY | COPY | EXECUTE OPERATOR | 28 | |
| CCOPY | "SKIP_IT" | LINE LABEL | 29 | CODE LINE:L9 |
| CCOPY | RETURN | EXECUTE OPERATOR | 30 | |

3602 points to ATTRIBUTE column. 3604 points to row with CCOPY/"128"/OPERATOR PARAMETER/6.

METHOD AND APPARATUS FOR BINARY-ORIENTED SET SEQUENCING

This application is a continuation of application Ser. No. 09/477,078, filed Jan. 3, 2000, now U.S. Pat. No. 6,470,351 which is a continuation of application Ser. No. 09/215,381, filed Dec. 18, 1998 now U.S. Pat. No. 6,092,077, which is a continuation of application Ser. No. 08/924,706, filed Sep. 5, 1997 now abandoned, which application(s) are incorporated herein by reference.

BACKGROUND OF THE INVENTION

1. Field of the Invention

The present invention discloses a method and apparatus for data organization, storage, retrieval and processing, that eliminates locational, structural or associative limitations.

2. Description of Related Art

Currently, information organization is implemented using many methodologies, which often serve different and distinct purposes for different general kinds of information. If the information is composed of specific facts, figures, names, and relationships, then the current approach forces each specific application to provide its own way of defining and using records. The only process who can possibly know what the information is, is the one application which creates/maintains that kind of information. At the lower OS level, data can be any type as far as a database or any other application is concerned. So files and directories are used to organize information, where physical and logical organizations of information are one and the same.

To find qualified and desired information, a process must first deal with files and directories. The process must incorporate and reflect the physical directory and file hierarchy into its logical information organization. Many current containment shells such as WINDOWS and DESQVIEW, attempt to provide a seamless gap between the OS and applications, so that a process does not have to deal with OS details. Aside from being unstable, such shells are still constricted by containment. That is, the logical and physical organizations of information become the same at some level. That is the level at which logical expansions, reorganizations, and further associations become impossible for containment.

SUMMARY OF THE INVENTION

To overcome the limitations in the prior art described above, and to overcome other limitations that will become apparent upon reading and understanding the present specification, the present invention discloses a computer-implemented method and apparatus for information organization, wherein atomic information can be both static and dynamic, but the compound information (e.g., associations, groupings, sets, etc.) of such atoms always remain dynamic. Unless otherwise directed, a compound information entity is always dynamically determined and generated. This determination is based on the processing of a defined condition, wherein all atoms qualifying the condition are included in the compound. This dynamic determination eliminates the need to "update" the compound, when atoms and/or compounds common to two or more compounds are changed. Further, each information compound can be dynamically generated based on an existing definition for that compound.

BRIEF DESCRIPTION OF THE DRAWINGS

Referring now to the drawings in which like reference numbers represent corresponding parts throughout:

FIGS. 7A–7E are a block diagram that illustrates a current method of organization implemented according to the present invention;

FIG. 10 is a block diagram illustrating the structure of the Universal Entity Identifier (UEI) according to the present invention;

FIG. 11 is a block diagram illustrating the structure of the Endo-Dynamic Information Node (EDIN) according to the present invention;

FIG. 12 is a block diagram that illustrates the valid combinations of the EDIN fields in terms of value according to the present invention;

FIG. 13 is a block diagram illustrating the structure of the Bond Information Record (BIR) according to the present invention;

FIG. 15 is a block diagram illustrating the structure of the Bond Flags portion of the BIR according to the present invention;

FIG. 16 is a block diagram illustrating the structure of the Bond Organization Record (BOR) according to the present invention;

FIG. 18 is a block diagram that illustrates the structure of a command line according to the present invention;

FIG. 19 is a block diagram that illustrates the structure of an Endo-Dynamic Information Statement according to the present invention;

FIG. 21 is a block diagram illustrating the structure of the Expandable Table Record (ETR) according to the present invention;

FIG. 22 is a block diagram illustrating the structure of the Expandable Table Array Header (ETAH) according to the present invention;

FIG. 23 is a block diagram illustrating the structure of the InfoFrame Control Record (IFCR) according to the present invention;

FIG. 24 is a block diagram that illustrates the structure of an Activation List Example according to the present invention;

FIG. 25 is a block diagram illustrating the structure of the Infobase Definition Record (IBDR) according to the present invention;

FIG. 26 is a block diagram illustrating the structure of the Set Definition Record (SDR) according to the present invention;

FIG. 27 is a block diagram illustrating the structure of the Module Definition Record (MDR) according to the present invention;

FIG. 29 is a block diagram that illustrates the structure of an Endo-Dynamic Set comprised of Set Definition Equations according to the present invention;

FIG. 30 is a block diagram illustrating the structure of the Operator Information Record (OIR) according to the present invention;

FIG. 31 is a block diagram illustrating the structure of the Parameter Definition Record (PDR) according to the present invention;

FIG. 35 is a block diagram that illustrates the structure of a program example according to the present invention;

FIG. 36 is a block diagram that illustrates the structure of an Endo-Dynamic Set comprising an interpreted program according to the present invention;

DETAILED DESCRIPTION OF THE PREFERRED EMBODIMENT

In the following description of the preferred embodiment, reference is made to the accompanying drawings which form a part hereof, and in which is shown by way of illustration a specific embodiment in which the invention may be practiced. It is to be understood that other embodiments may be utilized and structural changes may be made without departing from the scope of the present invention.

Overview

Information can be generally described as either being atomic or compound, where atomic information is an elementary unit and compound information encompasses any combination of atoms and other compounds to serve a given purpose. The present invention, termed Binary Oriented Set Sequencing (BOSS), is based on the concept that the minimal common information structure for any body of data is binary. This binary view of data organization achieves an information management environment in which any information of any complexity and type can be represented, viewed, stored, and processed.

The present invention further adopts a view of information organization where atomic information can be both static and dynamic, but the compound information (e.g., associations, groupings, sets, etc.) of such atoms always remain dynamic. Unless otherwise directed, a compound information entity is always dynamically determined and generated. This determination is based on the processing of a defined condition, wherein all atoms qualifying the condition are included in the compound. This dynamic determination eliminates the need to "update" the compound, when atoms and/or compounds common to two or more compounds are changed. Further, each information compound can be dynamically generated based on an existing definition for that compound.

The present invention differs in several ways from conventional information storage and processing environments. These are listed below, and described in ensuing subsections:

The InfoFrame

Binary Association

Universal Entity Identification

Dimensia

Associative Processing

As a result of these elements, an environment becomes feasible, where the elements of logical organizations of all data are stored as nodes. Further, processes are able to view the same nodes in different ways. To be more precise, BOSS can achieve any logical structure given the same basic set of information atoms. This means data is maintained the same way, regardless of the process manipulating it, and regardless of the process's view of the involved data. Instead of having to implement and store static single-purpose control structures and records, a process need only store a set definition equation which results in a particular view of the data. This promotes an environment in which a general pool of nodes for all kinds of different data can be used as the basis for dynamically generating different views for all the different processes which use pieces of the collective data pool in different ways.

Hardware Environment

Figure 1:
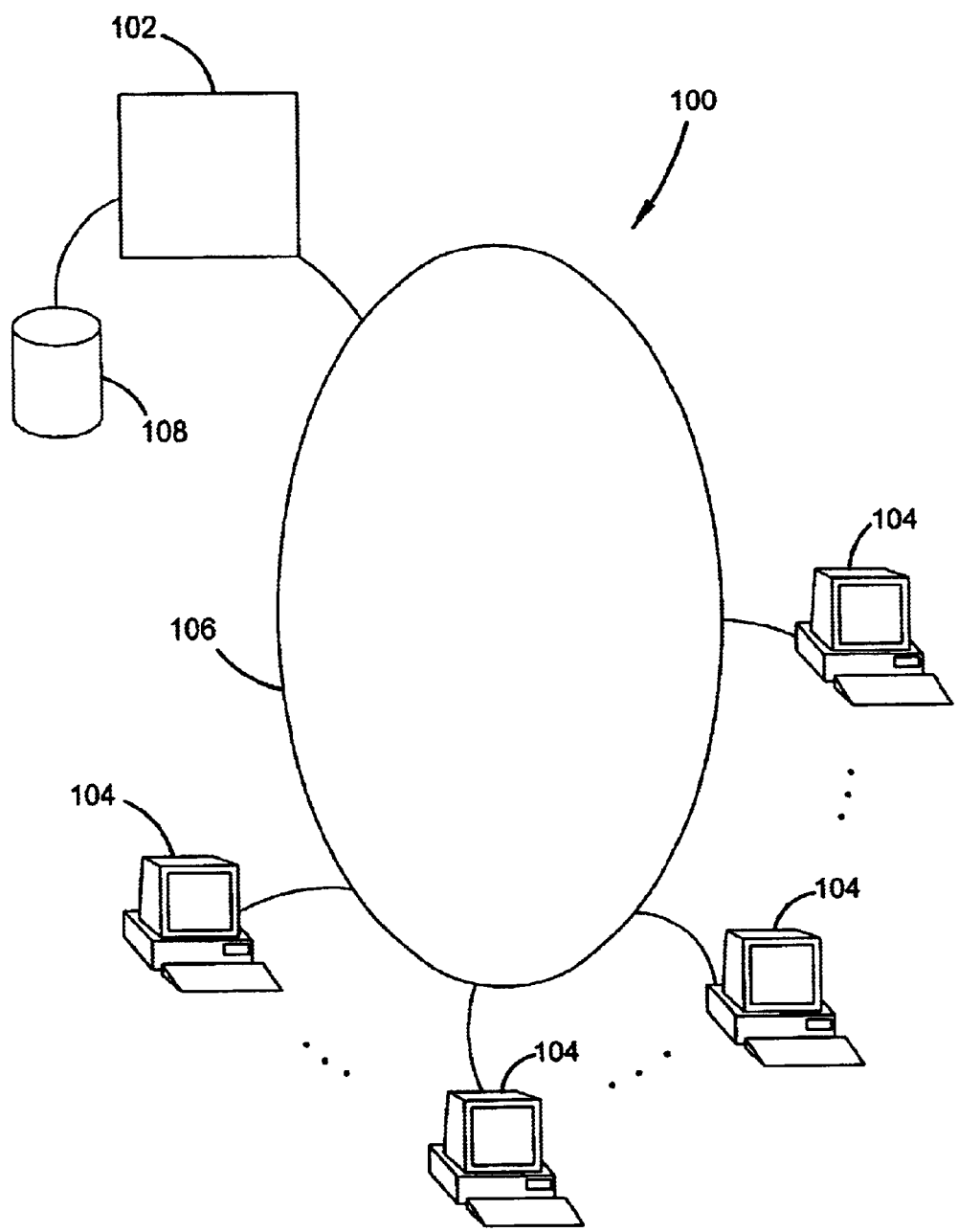
FIG. 1 is a block diagram that illustrates one possible hardware environment for the present invention.

FIG. 1 depicts the hardware architecture of the preferred embodiment in accordance with the principles of the present invention. Generally, the present invention operates in a network environment 100 having a decentralized hardware architecture, including one or more servers 102, and a plurality of user workstations 104, all coupled together through the network 106. In the preferred embodiment, the network 106 is depicted as having a ring topology. Those skilled in the art will be able to bring to mind other known network topologies such as, but not limited to, a star or a bus configuration. Typically, the server 102 will include a database 108, although the workstations 104 themselves could store all or a part of a database 108.

The InfoFrame

The present invention provides for the existence of a global (universal) Information Frame (InfoFrame), where all types of systems (InfoBases) which include various programs and databases (modules), and various data structures and data values (views and nodes) can co-exist in the InfoFrame, and data can be created, modified, organized, shared and exchanged on a dynamic basis. Data exchange across the InfoFrame is trivial, no matter what the system type. This makes all the processing of data import/export and usage across the InfoFrame invisible to all client processes.

Figure 2:
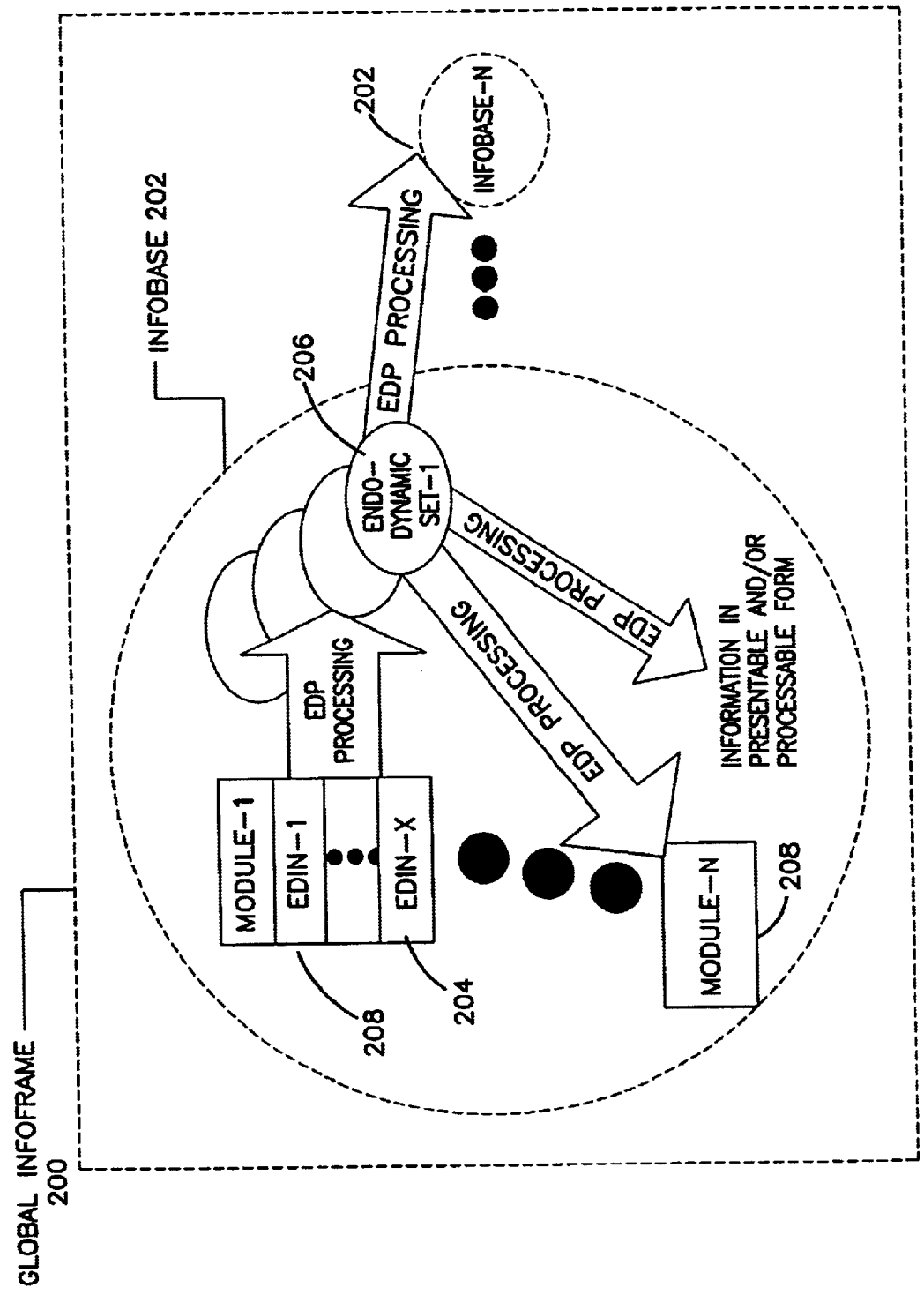
FIG. 2 is a block diagram that illustrates the structure of an InfoFrame according to the present invention.

FIG. 2 is a block diagram that illustrates the structure of an InfoFrame 200 according to the present invention. The present invention orders all information in the following manner:

Information Frame (InfoFrame) 200, which is the overall grouping of all information.

Information Base (InfoBase) 202, which is a set of information modules and other control information that provides a self-contained set of consistent modules which provide for needs of a BOSS client.

Endo-Dynamic Information Node (EDIN) 204, which is a binary association of two information atoms, Subject and Attribute, as well as a Bond that binds them.

Endo-Dynamic Set (EDS) 206, which is a dynamically generated, possibly ordered, list of EDINs 204 that describes, depicts, or embodies a subject, attribute, or bond.

Information Module (IM) 208, which is a set of EDS's 206 and other control information that provides a self-contained set of consistent EDS 206 which provide for needs of a BOSS client.

An EDS 206 may contain any number of EDINs 204 or be empty. The contents of an EDS 206 are dictated by a condition for that EDS 206, wherein the condition is provided by a Set Definition Equation (SDE). The more complex the SDE, the more particular data and/or data relationships are required to satisfy membership in the resultant EDS 206. However, SDE complexity does not directly effect the size of a resultant EDS 206. The size of a resultant EDS 206 simply depends on the number of EDINs 204 which satisfy the associated SDE. This size depends on the kinds of data being organized, and how frequently instances of that kind of data occur.

All EDS's 206 are dynamically generated using one or more modules as the source of generation. A module 208 is primarily a set of EDINs 204 with no particular order. Modules 208 can then be included in one or more InfoBases. Each InfoBase 202 provides evolved information access, searching, and processing, by including as many modules as required to account for all data and processes. The InfoFrame 200 is the totality of all InfoBases 202 and is the largest possible data space. Every individual computer or network has its own InfoFrame 200. When two or more computers or networks are connected such that data exchange is possible, the InfoFrame 200 has simply become larger. In this sense, there is only one InfoFrame 200 on a global basis, and it is just a matter of what portion of the InfoFrame 200 a user is connected to or has access to.

An EDS 206 differs from a set, as that term is understood in the art, in several important ways. First, an EDS 206 can have a heterogeneous meaning. That is, an EDS 206 can contain any number of different meanings, data or representations.

Second, an EDS 206 does not have to conform to the concept of containment. Containment is where an element "X" physically exists or is "contained" within set "Y". In a non-containment environment, there is no predefined meaning between "X" and "Y", just because one contains the other. In set methodology, the only meaning that can be derived is that "X" is contained by "Y". In the present invention, "X" and "Y" can have any number of relationships defined directly in EDINs 204 or streams of related EDINs 204.

Third, it is possible to execute expressions to modify an EDS 206 or create a new EDS 206 in terms of a meaningful formula. This formula is based on operators which can affect EDINs 204 or EDS's 206 in a number of different ways. In contrast, set-based mechanisms are based on adding or extracting the meaning of the set by adding or extracting elements from zero or more sets.

Since, by default, all modules are accessible across the InfoFrame 200, each added module increases the possibilities for different and new InfoBases 202 by a substantially large number. Clearly, this increase is non-linearly proportional to the number of modules 208. Formula A below gives the number of unique possibilities, where "n" is the number of modules 208. Formula B gives the absolute increase in unique possible combinations of modules 208, when one module 208 is added. Formula C gives the real number of increased possibilities, by assuming that ¾ of all such unique possibilities have no meaning and serve no purpose in reality. Table I shows the calculated numbers based on different module 208 numbers.

$$A = n!$$

$$B = (n+1)! - n!$$

$$C = ((n+1)! - n!)/4$$

wherein the "!" operator indicates a factorial operation. As can be seen, this is slightly less than "n×n".

The ease of integration and data sharing, combined with the rapid increase in potential new InfoBases, provides an environment where, as more data is added and as more processing takes place, the environment as whole becomes more stable and capable. Further, using automation and chaining for all levels of the InfoFrame 200 (including the InfoFrame 200), clients can tie together InfoBases 202 in particular ways, such that automatic activities take place, these activities including the monitoring, retrieval, storage, and determination of:

Entity value;

Entity organization;

InfoBase 202 chaining and the determination of chains;

Module 208 chaining and the determination of chains; and

InfoFrame 200 native processes and settings.

Given a defined InfoFrame 200, client processes can use BOSS operators as to manipulate part or all of the InfoFrame 200 in variety of ways to display, modify, process, search, etc., the information. A BOSS client always calls the Endo-Dynamic Processor (EDP), passing it a list of operators (and their parameters). The EDP is a software Command Processor (CP), which accepts an operations list as input and executes each line in the order specified by the operations list. Note that the operations list is an EDS itself, providing for variable number of parameters for the operators. In a pure BOSS environment, a top-level operation list (program) would be executed at power-on. This program is an infinite loop where exit is possible by satisfying monitor processes, and where each required InfoBase is located, verified, and initiated. In a multi-tasking environment (e.g., Windows), linear module chaining and InfoBase chaining is possible. In a multi-processing environment (e.g., Windows-NT), real-time (and therefore non-linear) InfoBase chaining and module chaining is possible.

In a multi-site (computer) environment, each site executes operations lists via its own EDP and accepts remote operations lists as well. Since a Universal Entity Identifier (UEI) identifies the site from which data originates (i.e., is located on), remotely located data is potentially slower, but is handled via EDP-to-EDP communication and data transfer that is invisible to the client. Therefore, it is possible for one site to initiate a process that will execute via the EDP of another site, thereby leaving the original site free to perform further immediate processing.

Binary Association

In a logical information organization, an atom of information can be a logical representation for a topic, event, process, or entity which can exist, be identified, and requires processing. A logical organization exists when the information atoms are associated in different ways to produce a structure. In current information organization methodologies, the only kind of association between two atoms of information is containment. This is true no matter how evolved the containment method may be. For example, in object-oriented programming methods, objects can have associated predefined processes, where this is accomplished by the object containing the processes or references to those processes.

Current methods maintain child-lists for each parent to record logical organization. A child is only recognized as having an association if it is a parent itself.

Figure 3:
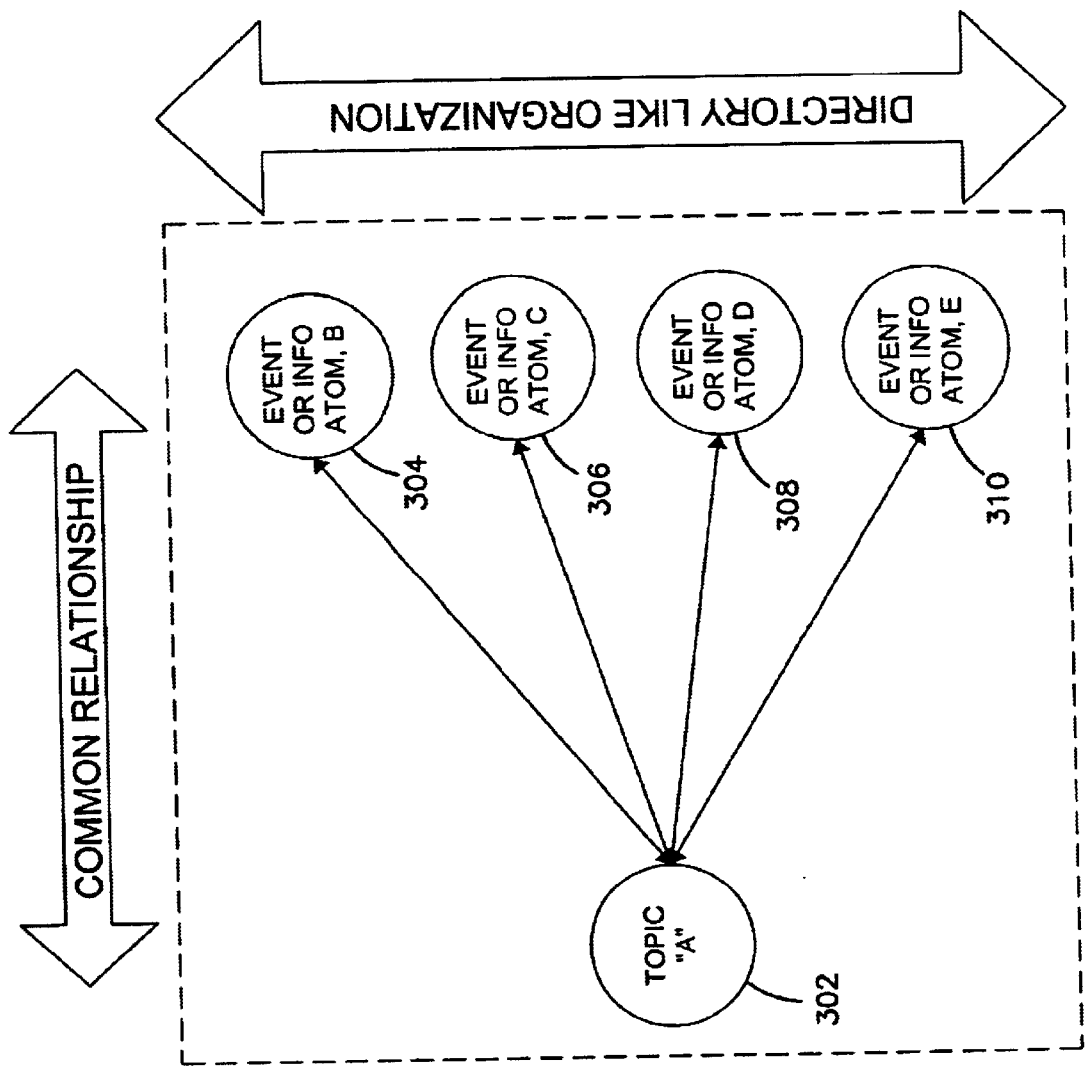
FIG. 3 is a block diagram that illustrates the associations present in a containment organization.

FIG. 3 is a block diagram that illustrates the associations present in a containment organization. In FIG. 3, the atoms shown on the right, identified as B 304, C 306, D 308, and E 310, are the children of A 302. The containment approach is to store the atoms (or identifiers to atoms) B 304, C 306, D 308, and E 310 in the logical control record for A 302. For example, a directory in DOS or UNIX is simply a file containing a list of that directory's contents.

Unlike a conventional set-element, the EDIN provides two atoms (or identifiers of atoms): a Subject and an Attribute. Each of the atoms given by an EDIN is an information atom in the sense described above. The Attribute provides additional association, enhancement or qualification to a given Subject atom. As a result, an EDIN contains a binary-association within itself. The EDIN is an independent entity, capable of existing in any EDS whose condition (SDE) can be met. The Subject and Attribute atoms can be used in various ways to express any number of different associations. As a result, an EDS (a set of EDINs) can contain any number of singular relationships to describe a more general association.

Figure 4:
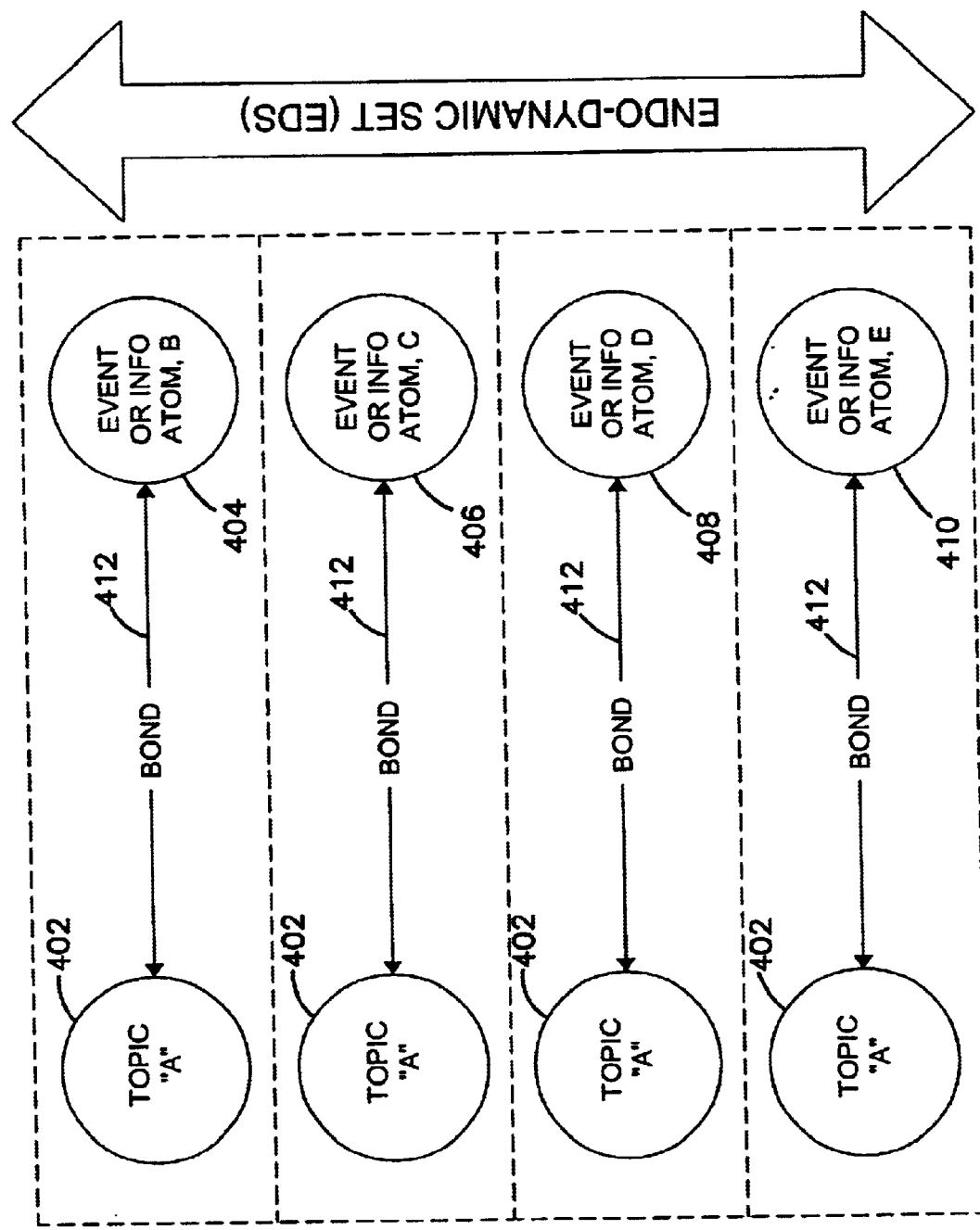
FIG. 4 is a block diagram that illustrates the binary associations according to the present invention.

FIG. 4 is a block diagram that illustrates the binary associations according to the present invention. FIG. 4 shows four EDINs with a Subject of A 402 and Attributes B 404, C 406, D 408, and E 410. The condition for this EDS is simply that the Subject of each EDIN must be A 402. Each EDIN provides a relation, but all EDINs together describe the same tree as shown in FIG. 3. In this way, a collection of EDINs provide binary-associations between Subject atom A 402 and the various Attributes 404–410.

Note that it is equally possible to dynamically generate another EDS where the condition (SDE) is that the Attribute must be B 404. This EDS would describe all-atoms which have the Subject in a relation with B 404. Yet another SDE could produce an EDS where all Subjects are A 402 and all Attributes are B 404. This EDS would describe all the possible associations of A 402 and B 404.

Figure 5:
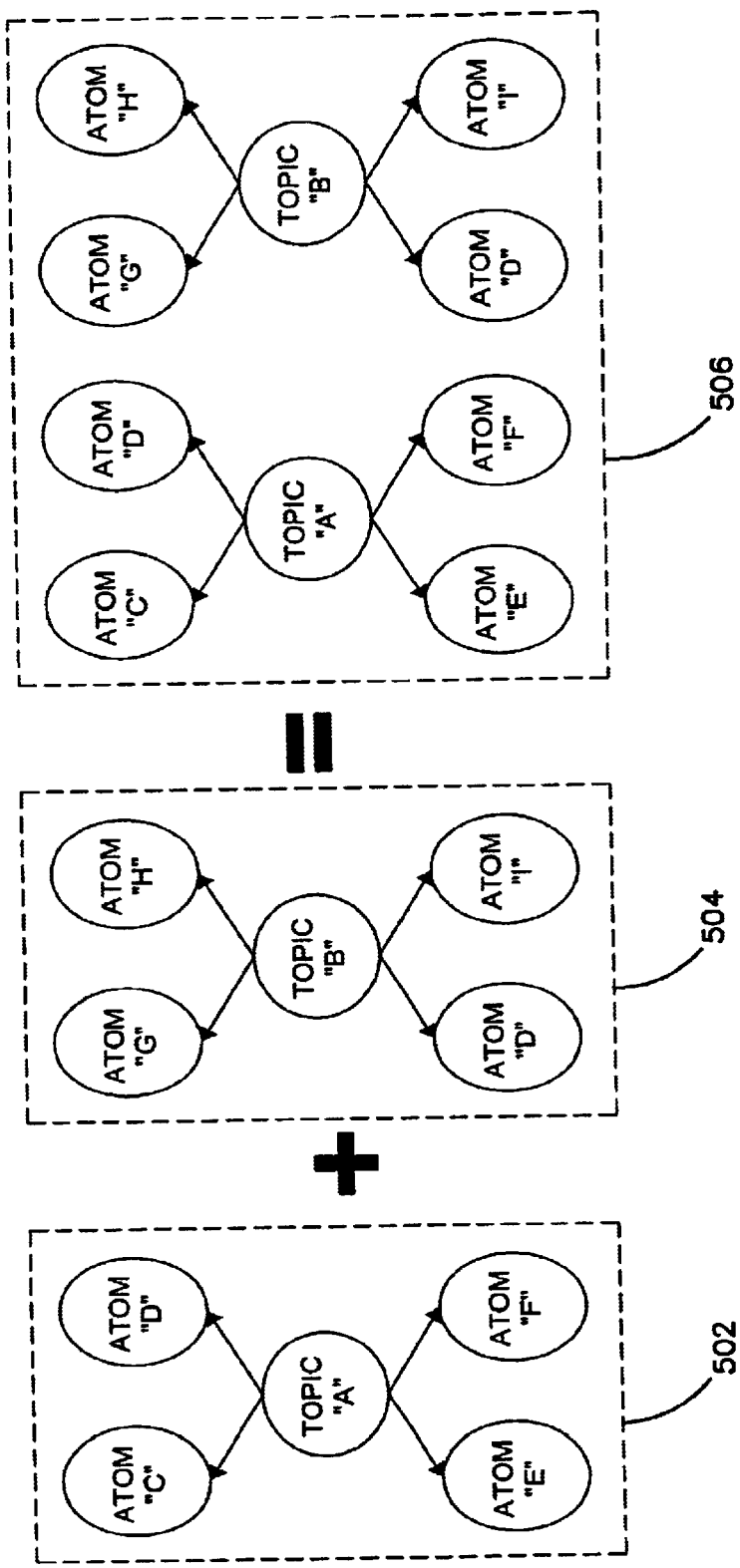
FIG. 5 is a block diagram that illustrates grouping in a containment organization to achieve a combined topic.

Containment methods also experience problems when two existing information organizations need to be combined. FIG. 5 is a block diagram that illustrates grouping in a containment organization to achieve a combined topic. The two existing organizations under A 502 and B 504 are combined to produce a combined organization 506. No new associations are produced, the associations of A 502 and B 504 remain unchanged. Containment methods have no way of actually integrating the two organizations because identification of atoms is based on location. Consider the atom D 506 under topic A 502. This atom also occurs under topic B 504. In the resultant combined organization, atom D 506 is duplicated, since the location of the two were different prior to combining the organizations. This is actually not good as the duplicate atom in the new organization will confuse existing processes which access atom D 506. As a result, combing two logical containment organizations is often manual and always time consuming. Using BOSS, the same two organizations can be combined without the problems common among containment approaches.

Figure 6:
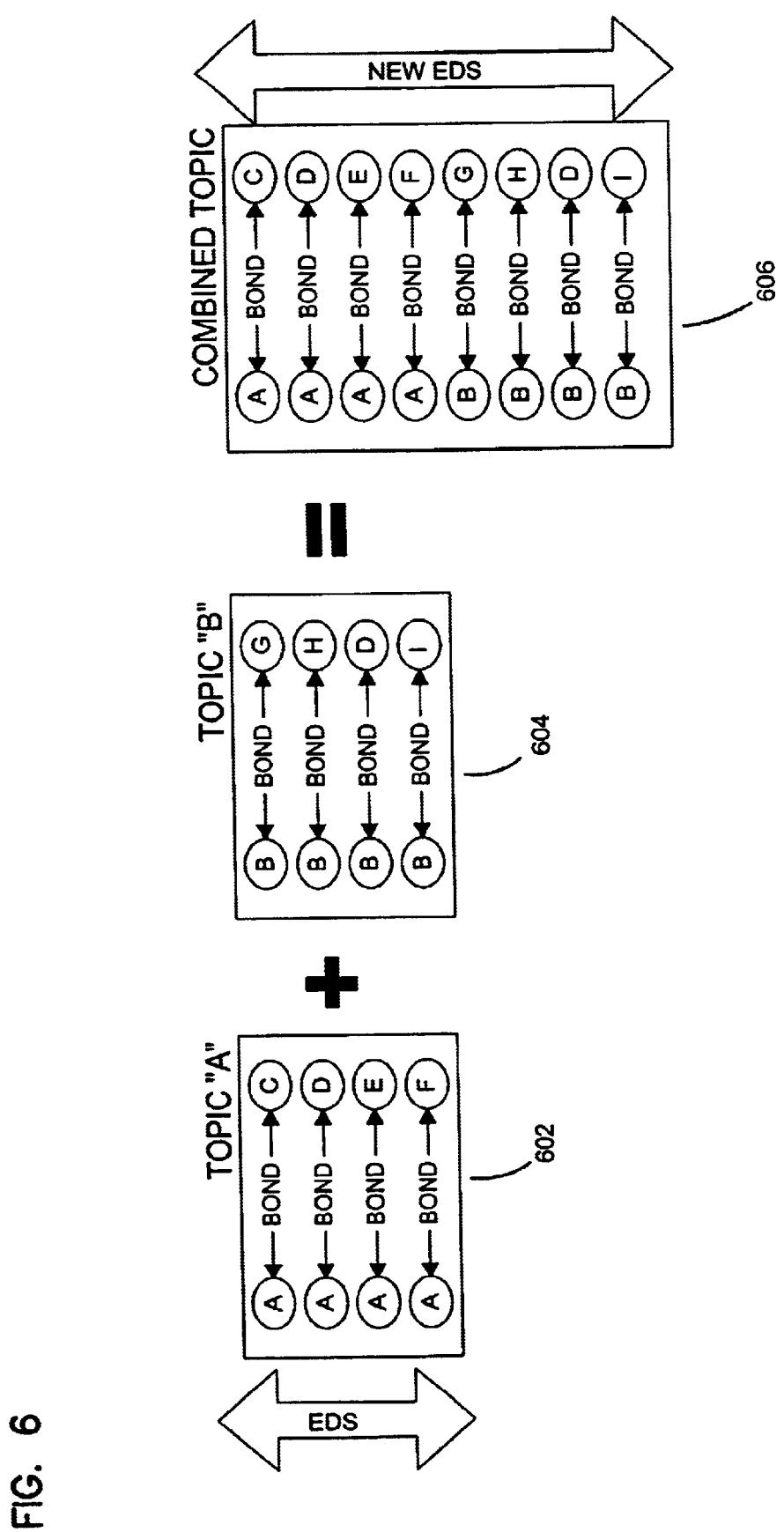
FIG. 6 is a block diagram that illustrates grouping according to the present invention to achieve a combined topic.

FIG. 6 is a block diagram that illustrates grouping according to the present invention to achieve a combined topic. FIG. 6 shows an EDS format of the same topics A 602 and B 604 as in FIG. 5. Again, atom D occurs both under topics A 602 and B 604 prior to the merge. The combined topic 606 simply contains all EDINs of both topics, where the condition for the EDS is that the EDIN Subject must be either A 602 or B 604. The atom D occurs as the Attribute of two EDINs, but is not duplicated. That is, both EDIN Attributes identify the same exact information atom.

In this way, BOSS is independent of the location of information atoms in an organization. In other words, BOSS achieves a complete separation of physical and logical locations of data. Note that this is only possible because of the endo-binary nature of the EDIN, the derived binary association in an EDS, and universally unique data identification and location.

Universal Entity Identification

The next cornerstone of BOSS is the universally unique identification and location of items. In BOSS, each set and each element is uniquely identifiable via a Universal Entity Identifier (UEI). This means that any topic/object can be uniquely identified, under all conditions. If this were not true and a containment-based approach were used, BOSS could be inadvertently rendered impotent because the Subject and Attributes of an EDIN could be ambiguous. The ambiguity is introduced because if an item (Subject or Attribute of an EDIN) cannot be uniquely identified, it cannot be uniquely or correctly associated with other items.

Dimensia

The next element of BOSS is called "Dimensia". Dimensia loosely refers to contexts or levels of abstraction that a method for information organization is able to achieve at both atomic and non-atomic levels. Most current systems use flat or static multi-level methods for information organization. A flat method or structure employs one level of abstraction. A static multi-level method provides a maximum of N predefined levels of abstraction.

In all current methods, an information atom qualifies and/or describes itself. For example, an object in an object-oriented programming system may contain the atomic element's 32 bit number, string, and date. While describing itself, the singular atom does not immediately provide a relationship to any other entities. For example, an atomic date object element simply tells you that fact; it does not provide you with any relationships it may have to any other entities. It is the object containing the elements which is known to have relationships with each atom. By further including object deriving procedures in an object, one or more atoms may be related to other entities, but only the object driver knows this fact, and the identity of the associated entities. So even in evolved containment methods, only a limited set of the data relationships are given by the data itself; the rest is process dependant.

FIGS. 7A, 7B, 7C, 7D, and 7E are block diagrams that illustrate a current method of organization, e.g., a binary tree 702. To have this logical structure, the organization can be of two general types. It can be an array 704 where tree-traversal is performed via mathematically calculated indexes, based on current index. Or it can be a set of records 706 with left and right pointers. In either case, an inflexible control structure is used to achieve logical organization. These structures are inflexible because they are static in nature. For example, should the order of the elements in the array 704 change, a different tree (if one is decipherable at all) is now represented. The record example 706 is free of this problem, but the control record is particular and can only be used for binary trees and linked lists.

In BOSS, each EDIN contains a Bond between a Subject and an Attribute. As described above and shown by FIG. 3 and FIG. 4, an EDS 708 can represent a tree by collecting all EDINs with the same Subject. However, to implement all levels in a tree, Attribute atoms in EDINs occur as Subject atoms in other EDINs. In FIGS. 7A–7E, to record the example binary tree 702, an EDS 708 records enough EDINs to relate all required associations. Note that to discern left and right children, the Bond specified in the EDIN can be used. Note that since an EDS is dynamically generated, insertions and deletions to/from a weighted tree 710 are trivial as shown in FIG. 7E, and do not involve complex left or right sub tree rotation.

In general, by duplicating the EDIN (i.e., twice the control data) with same Subject and different Attributes, two or more relationships of the same Subject atom and various Attribute entities can be established. In each case, the particular relationship is identified. In this way, all the different relationships an atom has to one other entity, as well as expressing all the different entities with which that atom has a relationship, can be expressed. Therefore, using BOSS methodology, the maximum number of possible individually defined relationships of one entity with others is infinite and is only constrained by the amount of available storage space. This is a major aspect of Dimensia.

Figure 8B:
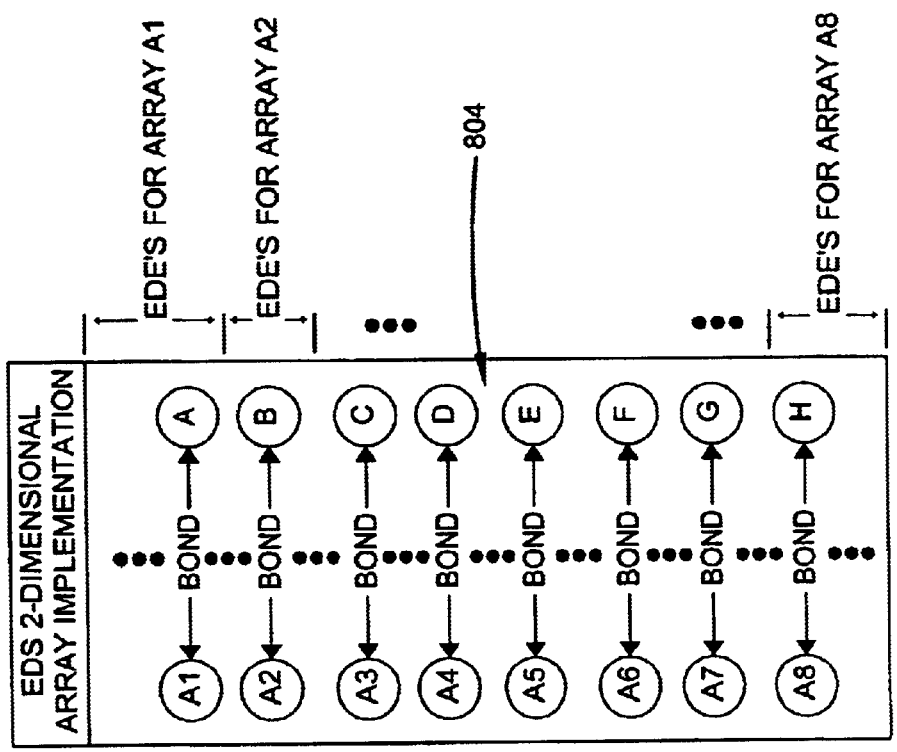
FIGS. 8A–8B are a block diagram that illustrates a compound logical structure according to the present invention.
Figure 8A:
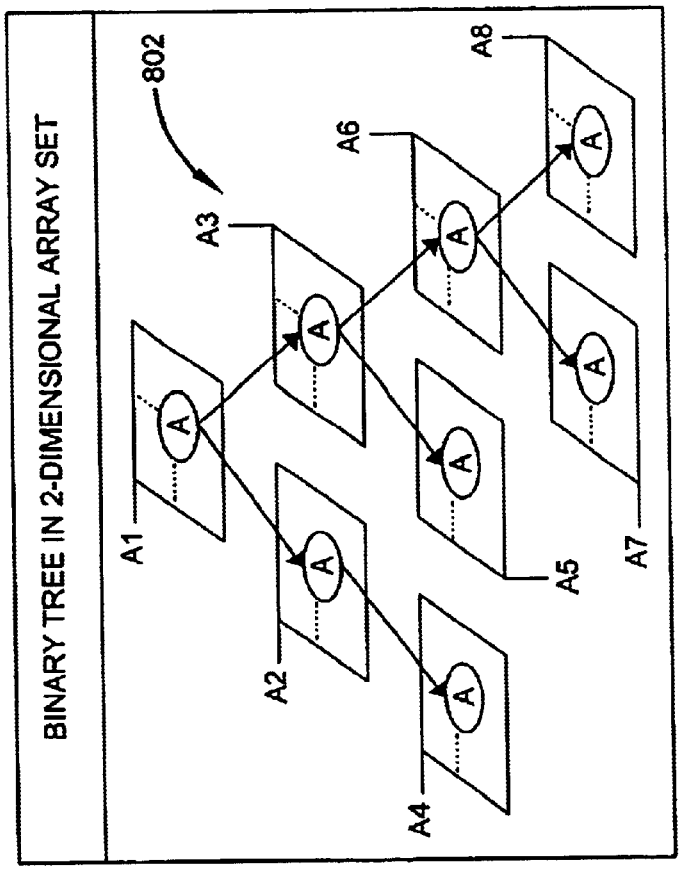

When complex and/or compound logical organizations of data are used, current methodologies are also forced to employ (and implement) complex and/or compound processes to traverse the organization. Consider the case shown in FIGS. 8A and 8B, which are block diagrams that illustrate a compound logical structure according to the present invention. In FIGS. 8A–8B, each atom of the example binary tree 702 of FIGS. 7A–7E is also an element in a distinct and separate two-dimensional array 802. Using current methodologies, new structures must be introduced, i.e., eight two-dimensional arrays of DATA IDENTIFIER. The DATA IDENTIFIER values of atoms "A" to "H" would then be stored in appropriate locations in one of arrays, A1 to A8. Now the program dealing with the data must not only include processes for the old binary-tree record 706, but also include processes to manipulate the arrays.

To implement the example compound organization 802 using BOSS, new EDINs are introduced, not new structures or processes. FIGS. 8A and 8B illustrate a simple (and inefficient) two-dimensional array implementation, where the EDINs are sequenced based on a value calculated from two-dimensional values. The EDS 804 actually encompasses all the arrays, where sequenced subsets of EDINs represent two-dimensional arrays. In each EDIN subset, the atom which coexists in the binary tree 802 is shown; this atom would occur in the sequence resulted from its array coordinates. Each such EDIN set is not a two dimensional array in the actual sense, and is very sparse. Again, the dynamic nature of an EDS, means that the EDS is sequenced upon generation.

Note that the additional EDINs 804 to represent the arrays could be stored together with the EDINs for the binary tree 708 of FIGS. 7A–7E in a module. Upon loading the module, and depending on the Set Definition Equation (SDE) used, one or the other of the EDS's can be produced. In this way, Dimensia is made possible for information, where no new processes or control structures are required, and only new SDEs and EDINs are introduced and processed (as per before) to produce different and currently incompatible views of the same atoms of data.

Associative Processing

Figure 9:
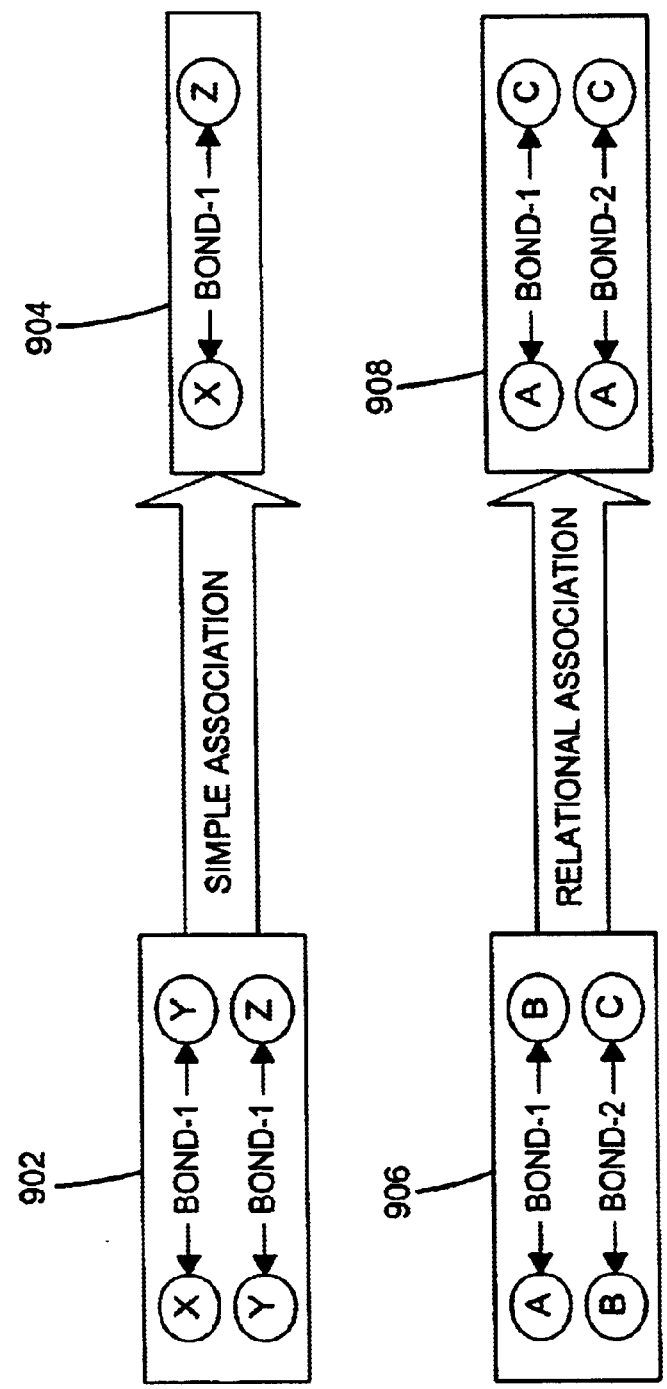
FIG. 9 is a block diagram that illustrates associative processing according to the present invention.

The next cornerstone of BOSS is associative processing. As mentioned above, a Bond in a given EDIN identifies a native BOSS process associated with the Attribute of that EDIN, and possibly involving the Subject of that EDIN. In a BOSS environment, it is possible to automatically establish and execute new associated processes, based on a given information set. As a simple example, consider the two EDINs given as 902 in FIG. 9, which is a block diagram that illustrates associative processing according to the present invention. Based on these EDINs, the BOSS process is able to automatically derive and store the third EDIN 904. From then on, the item "X" has direct relationships with both "Y" and "Z". Note that the derived EDIN 904 can only be assumed to be correct when the relation is transitive in nature (i.e., X BOND Y=Y BOND X). For example, the "brother of" relationship is transitive, while "father of" is not. Aside from simple association, BOSS can derive associations whose correctness is not absolute. Consider the EDINs given as 906 in FIG. 9. Possible automatic derivations are shown as the EDINs 908. Such proposed EDINs can then be automatically checked for correctness by gathering all data about "A" and "C" and then performing an exhaustive cross check to establish one of the following general results:

Not enough data

The correct and incorrect EDIN(s)

Since EDINs with any contents and purpose can coexist in a given module, it is possible to automatically derive new relationships and associated processing and store such new information in the same module, thereby expanding the InfoFrame of BOSS on an automatic and dynamic basis.

Hardware Evolution

The principles of BOSS outlined thus far are hardware compatible concepts. It is possible to reduce the vast majority of BOSS operators directly into hardware. Indeed, most of the BOSS operators and the Endo-Dynamic Processor have been designed such that they can be converted (or evolved into) hardware.

This simple fact renders BOSS one of the most powerful data organization approaches in existence. Besides being able to operate two to three orders of magnitude faster than conventional data organization approaches when implemented in hardware, BOSS is infinitely more flexible.

Based on the evolution of hardware devices, the demand for order of magnitude solutions is greater than ever. Further, the existing approaches to solving the increasingly complex data organization, migration and integration issues are being limited by the engines used.

The BOSS methodology also promises interesting advances in CPU design. Consider that a UEI can also be a machine code mnemonic. A natural result of this fact is that the data of an EDIN can also be a program, under the correct circumstances. Further, it is possible to also create processing actions based on the binary relation found in an EDIN.

Components

Unless specified otherwise, when any component or list is stored to file, a number of operations occur. First, a checksum of the component is calculated. Next, the checksum, followed by a size (or number of records) is stored at top of file. Finally, the component is saved. Loading performs the reverse actions.

Universal Entity Identifier (UEI)

FIG. 10 is a block diagram that illustrates the structure of a Universal Entity Identifier (UEI), which is the heart of information location and identification in BOSS methodology. A UEI contains two fields to provide a universally unique location for a physical body of data. These are the Site Owner Identifier (SOI) and the Site Entity Identifier (SEI). The SOI is the serial number of the EDP operating at a given site or some other unique identifier for an EDP. The SEI is a unique incremental number per site, where the SEI is assigned and incremented each time a new data entity is created. An SOI and SEI together are called a Combined Data Identifier (CDI). A CDI combines the duties of identification and physical location into a single entity. This is contrary to many current methods, where location is derived or is cross-referenced based on a given identifier.

Endo-Dynamic Information Node (EDIN)

FIG. 11 is a block diagram that illustrates the structure of an Endo-Dynamic Information Node (EDIN), which comprises the elements in an EDS. The EDIN is the most atomic form of stored BOSS information. An EDIN is composed of four fields, i.e., a Subject UEI, an Attribute UEI, a Bond UEI, and a Sequence field. The Subject, Attribute, and Bond UEIs can occur in other EDINs and in other fields. For example, an Attribute UEI can be a Subject or Bond UEI in another EDIN. The Sequence field is used to enforce a predefined order for the EDINs in an EDS.

EDIN Combinational Behavior

FIG. 12 is a block diagram that illustrates the valid combinations 1202 of the EDIN fields in terms of value, i.e., non-null, null, and "any" (i.e., could be either null or a valid value) according to the present invention. Since any field in an EDIN can contain a null value, it is prudent to specify the exact set of possible combinations and their meanings.

The first and most common combination is for all valid EDINs which are simply elements in a set.

The second combination is used when an item of information is "nullified" (see below) This has the effect of making the Attribute item inaccessible in all non-edit BOSS processes.

The last two combinations are shown for completeness. These combinations, and all others not shown by FIG. 12, are illegal and invalid occurrences of EDINs.

Nullified EDINs

As shown in FIG. 12, if the Attribute of an EDIN has a null value, it is called a Nullified Subject Node (NSN), where the Subject of a NSN is the item being nullified. When a NSN is created, all EDINs with the same Subject and all the EDINs with the same Attribute UEI, as the NSN subject, are now prohibited from being including on all subsequent EDS generations. This has the effect of hiding information, or hiding a particular section in an organization. To remove a nullification (un-nullify), the NSN is simply removed from a module. Now, all previously invisible items or hierarchy branches are made visible again.

The NSN is strictly optional and it's presence or absence does not invalidate or limit the working of BOSS methodology. If used, NSNs can augment BOSS with an information hiding capability.

Bond

The third EDIN field is a Bond UEI value. This ensures that Bonds are universally unique. A Bond value identifies a process where processing occurs based on an interpretation of the EDIN Attribute field; these include a noun, verb, adjective, adverb, action, action-sequence, etc. In all cases, the Bond is known to be between the Subject and the Attribute.

Figure 14:
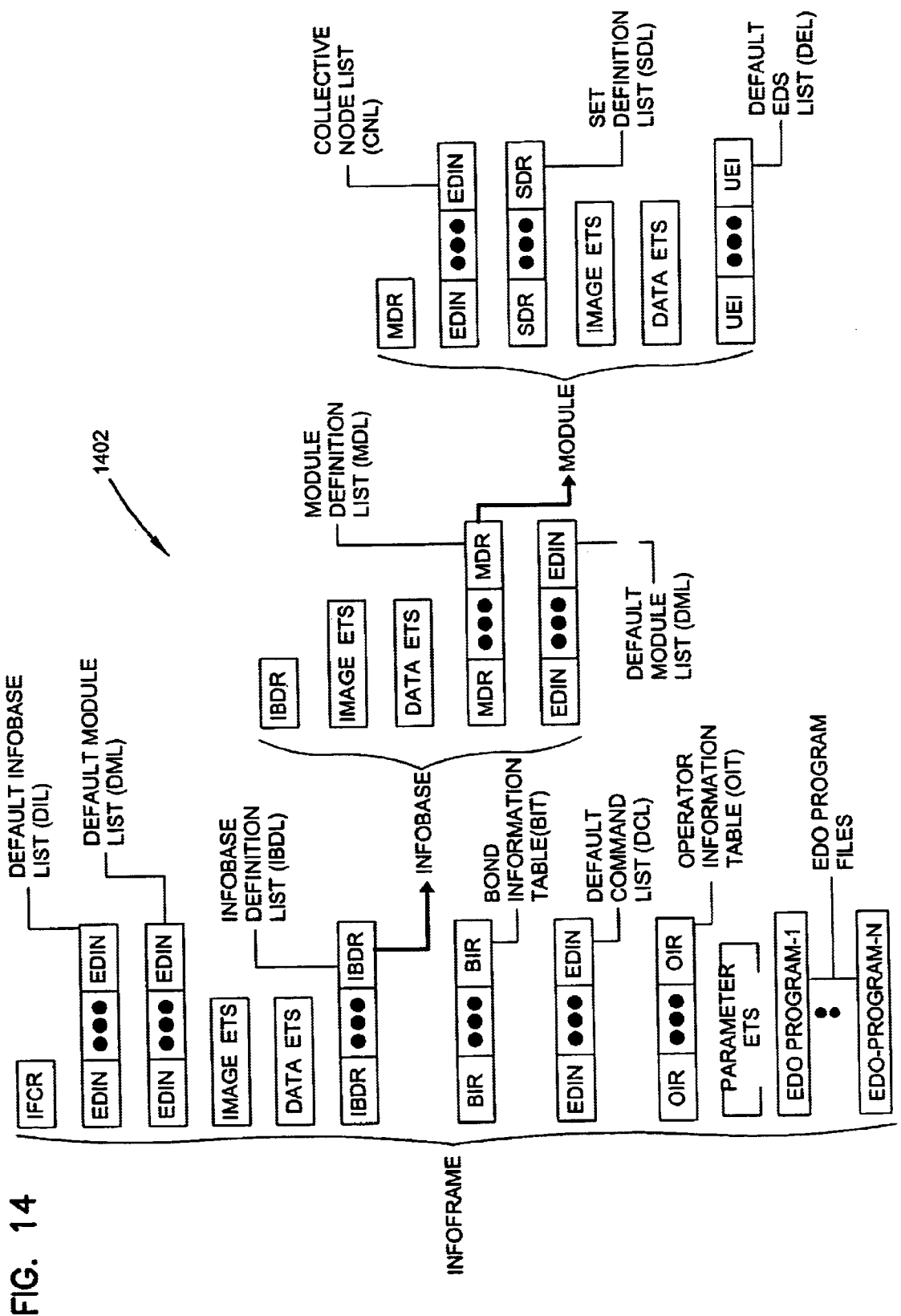
FIG. 14 is a block diagram that illustrates the structure of an InfoFrame according to the present invention.

FIG. 13 is a block diagram that illustrates the structure of a Bond Information Record (BIR), which records Bond information. A BIR has three fields. The first is a Bond to provide a key in the Bond Information Table (BIT). The BIT is a list of BIRs sorted by the Bond field. As shown in FIG. 14, the BIT is stored at the InfoFrame level. The second field of the BIR is a flag to describe the basic properties of the Bond. The last field of the BIR is UEI which identifies the associated process to be executed (by the EDP). This is most often an EDO, but can also be a major subsystem of the EDP which handles this and other similar bonds or a BOSS program. The images and any default values for bonds are stored in the IMAGE-ETS and DATA-ETS at the InfoFrame level.

As shown in FIG. 15, the Bond Flags field in the BIR gives the properties of the Bond, as follows:

Active/Passive—Active Bonds institute immediate processing and interrupt the active process flow until they are terminated. Passive Bonds are relations which make a statement of fact or existence; they do not instigate immediate processing, but are used in the various BOSS processes to generate and process EDS'S.

Operator—This flag indicates that the Bond is an EDO. Although redundant, EDOs are also Bonds recorded twice. The UEI for the EDO Bond is identical to the EDO UEI given for that EDO in the Operator IT (forces active as flag enable).

Call—This flag indicates that the Bond is a BOSS process including a SDE, BOSS program, EDP command list (forces active as flag enable). When this flag is off, the associated process is assumed to be an OS binary program.

Spawn—This flag indicates that a non-BOSS process is to spawn concurrently or multitask (forces active as flag enable and call flag disable).

User/Native—This flag indicates whether the Bond is a native Bond as supplied by the EDP, or a Bond created by other person or process. Whenever a Bond is created, this flag is set to User, since any native Bonds would be supplied by the EDP or shipped as upgrades.

In order for Bonds to make sense to a user, not only do they have to have names, but also some form of organization. The names/images for all Bonds are stored in the IMAGE-ETS, using the Bonds as the search key.

In order to provide organization, the Bond Organizational Record (BOR) is used. A minimal form of the BOR is shown in FIG. 16. This BOR contains only two fields, a SELF and a RELATED Bond. Using this simple record, almost any logical organization of Bonds can be achieved.

Figure 17:
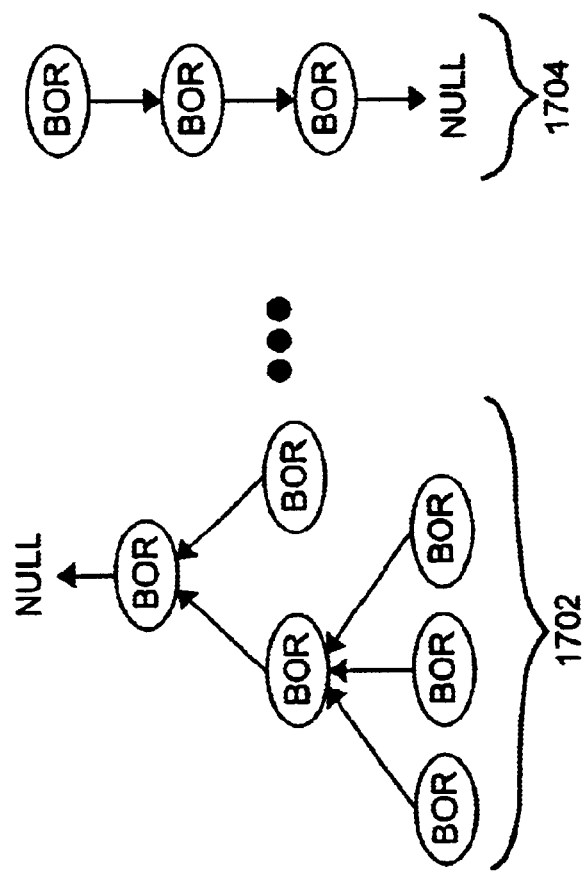
FIG. 17 is a block diagram that illustrates logical bond organizations according to the present invention.

As shown in FIG. 17, anything from a multi-level tree 1702 to a simple list 1704 is possible. Depending on the running process, different logical structures can be adopted.

A Bond value should always occur in the Bond EDIN field. Consider a bond UEI which is recorded as a subject or attribute of an EDIN, with some other Bond value in the EDIN bond field. When this EDIN is processed, the bond recorded as subject or attribute will behave as a subject or an attribute, and not as bond. This can cause errors in EDP processes and clients which require and recognize the subjected/attributed bond for their critical processing.

Endo-Dynamic Set (EDS)

Any dynamically generated or simply loaded list of EDINs is an Endo-Dynamic Set (EDS). An EDS always has a particular purpose and meaning, as known only to the process using the data. For example, an EDS generated from a program module could be a program data structure, a program data occurrence, or a procedure occurrence. The EDINs in the EDS also may be or may not be ordered, depending on the requirements of the data being represented by the EDS as a whole.

EDS's are identified by UEIs, but for the most part, this is done indirectly and not in the same manner as other entities. The UEI associated with most EDS's is actually the identifier for a Set Definition Equation (SDE). Given any module, the SDE can be used to (re)produce an EDS with the same exact membership conditions and potentially different elements. Instead of storing the distinct EDS's present in a module, only the equations (SDEs) need be stored. This is required to ensure EDS's generated via SDEs remain dynamic at all times, and is somewhat smaller since set elements need not be duplicated. Since an SDE is itself implemented as an EDS, it is necessary to store the SDE-EDS in the same module.

Basic EDIN Sequences

Information can be generally categorized as being active or passive. In this view, EDIN sequencing in an EDS takes one of two basic forms: active sequence and passive sequence. An active sequence is always an executable process of some form; a passive sequence always expresses the structure, existence, qualities, properties, values, etc., of some information. Put differently, an active sequence performs some activity, while a passive sequence provides data about some information. Further, BOSS methodology allows for any combination and number of occurrences of both kinds of EDIN sequencing in the same EDS. However, this would involve overhead processing, and the availability of a client program to process the passive sequences. Some passive sequences have associated native processes which handle or drive those particular kinds of passive information required for BOSS operations. In both cases, the EDIN sequence field is used to establish the EDIN order. For active sequences, the EDIN sequence value starts from zero and goes up to the number of required EDINs, where an EDIN sequence value is never duplicated in an active sequence. For passive processes, the EDIN sequence may or may not be required, depending on the information being represented by the passive sequence. For example, if the passive information comprises files maintained hierarchically in directories, which exist in volumes, the sequence field is not required. However, if the passive information is a data structure definition, with elements in some depth, the sequence fields are used to order the elements of the structure. The only EDIN sequence value which can be duplicated in a passive sequence is a "null" value.

To express an active sequence, one or more Endo-Dynamic Command Lines (EDCL) are used, where the order of the EDCLs, as established by the EDIN sequence fields, embodies the required active sequence. To express a passive sequence, one or more Endo-Dynamic Information Statements (EDIS) are used, where the EDINs may or may not be ordered by the EDIN sequence field.

Endo-Dynamic Command Line (EDCL)

The BOSS central process, the EDP, takes command lines as input. An Endo-Dynamic Command Line (EDCL) is dynamic in nature, and variable length. The basic EDCL 1802 is shown in FIG. 18. First, any number of EDINs bond any number of parameters to a subject identification, the subject being an EDCL 1802. Then, an EDIN bonds the EDCL 1802 (same subject) to an executable entity, shown as "XXX". The EDINs are ordered by the sequence field to place parameters before the execution occurrence. The executable entity XXX could be an endo-dynamic operator, a BOSS process (including SDE, BOSS program, activation list, etc.), or an OS executable program.

EDOs form the "instruction" set available from the EDCL 1802. EDO EDCLs 1802 are the fastest to execute, and require the least amount of overhead processing. A BOSS process is any ordered list of EDCLs. This could be an SDE, a BOSS interpreted program, an activation list for an Info-Base or InfoFrame, etc. An OS executable program is externally executed and requires the most amount of overhead processing.

The EDCL 1802 differs from conventional command lines in several ways. Clearly, the EDCL 1802 is variable length in that any number of parameters are possible. The EDCL 1802 is also dynamic, in that parameter and execute EDINs (all EDINs for an EDCL 1802) can be changed dynamically, and the EDCL re-executed. Note that the EDCL 1802 trigger for the EDP is the Bond field of the EDINs, not the subject or attribute fields. This is an important aspect of BOSS methodology. Using the Bond as a trigger means that, in EDCL 1802 processing, information subjects and attributes can occur freely and without affecting the process flow.

The EDCL 1802 forms the basis of BOSS processing. Using combinations of EDCLs 1802, any process what so ever, using any kind and number of parameters, can be accurately recorded and executed. Using the generic EDCL 1802 enables all BOSS clients to dynamically create and modify any kind of EDCL group, and then have it executed and re-executed by the EDP. As should be obvious, the EDCL 1802 provides a simple and powerful way of implementing, maintaining and executing genetic algorithms. Many of the EDP initialization, and default information processes, are expressed and stored as an ordered list of EDCLs 1802. Any ordered list of EDCLs 1802 is referred to as an Endo-Dynamic Command Set (EDCS) 1804.

Endo-Dynamic Information Statement (EDIS)

An Endo-Dynamic Information Statement (EDIS) is two or more EDINs which make a statement of fact about some subject. The basic EDIS 1902 is shown in FIG. 19. In this figure, several attributes are bonded (possibly via different bonds) to the same subject "A". When order and hierarchy are required for the information, an EDIN attribute UEI (shown as "B") occurs as the subject of other EDINs, whose attributes further describe the UEI (i.e., "B") originally occurring as an attribute of a subject.

This is an important aspect of BOSS methodology. The interchangability of the subject and attribute UEIs means that any depth and breadth of information hierarchy can be achieved. Further, upward or backward links can be introduced into the information hierarchy, such that a workable information network/graph is achieved.

The EDIS 1902 is dynamic in nature, so that the expressed passive sequence is a dynamically established one. Since EDINs can be freely inserted into an EDS, and the EDS reordered, any information represented as a passive sequence remains dynamic. In the example shown in FIG. 19, the EDIN sequence fields are not used. However, many passive sequences require this field to establish order among the EDINs. Any passive sequence of EDINs is called an Endo-Dynamic Statement Set (EDSS) 1904.

Data and Images

So far, all information has been referred to in terms of UEIs. While the UEI does provide all required information about an entity to a process, it means little to an end-user. For example, while a program can process and maintain an EDS identified by the UEI value "112:10", it would be pointless for that program to display those numbers to an end-user. Clearly, names and/or images must be associated with each unique entity, so that a program can use them in its display interface. Hereafter, "image" refers to both a binary image and a name-string.

Aside from an image, an entity (as represented by an EDIN), may also have associated physical data. For example, a BOSS-applied database program would use EDINs to record logical relationships and groupings, but it could not directly use EDINs to store the different data values being maintained by the database.

Both images and physical data are examples of Variable Length Data (VLD). To maintain and store VLD in general, a format called "Expandable Table Set" is used.

Figure 20:
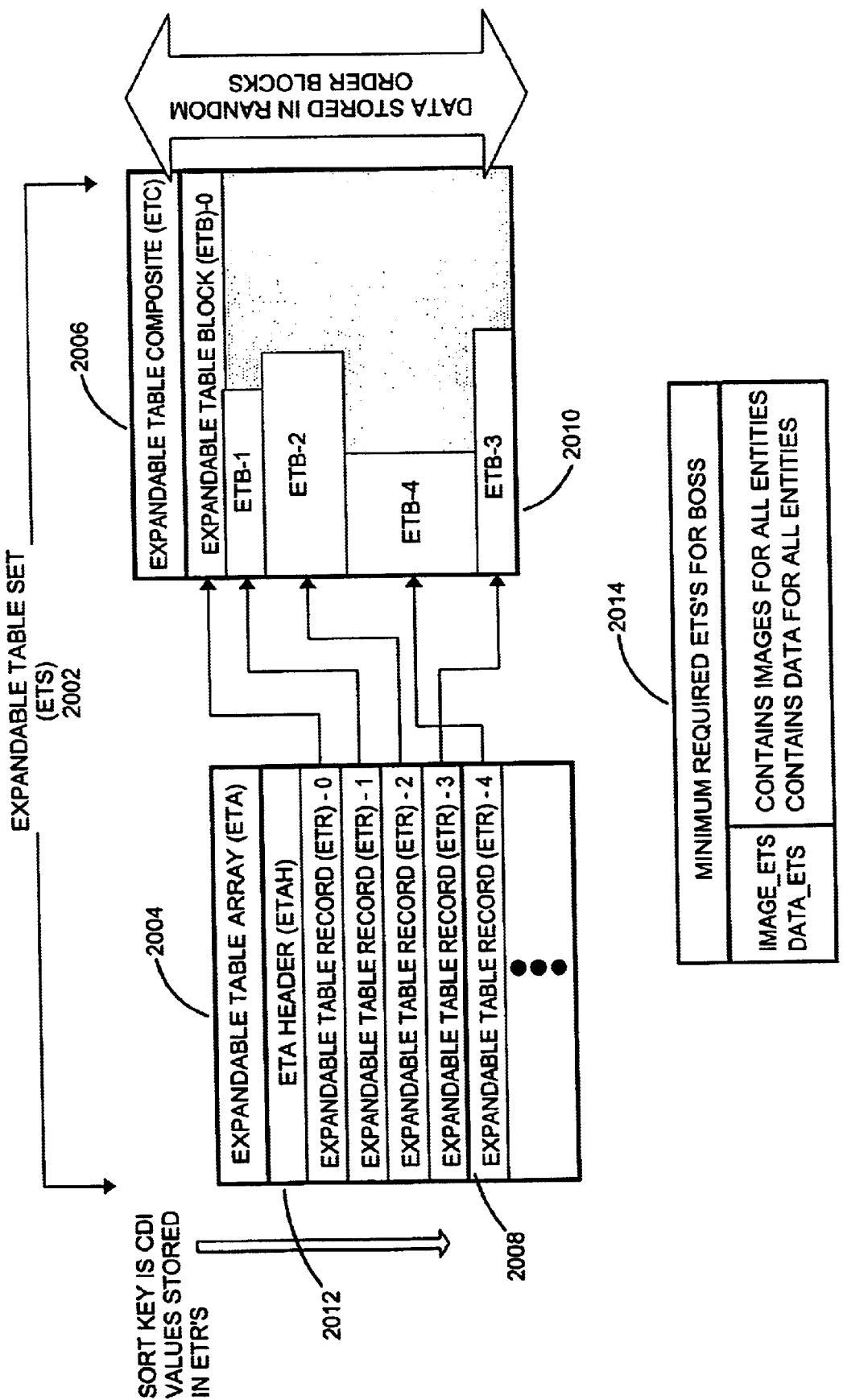
FIG. 20 is a block diagram that illustrates the structure of an Expandable Table Set according to the present invention.

As shown in FIG. 20, an Expandable Table Set (ETS) 2002 is a file or memory pair, consisting of an Expandable Table Array (ETA) 2004 and an Expandable Table Composite (ETC) 2006. The ETA 2004 and ETC 2006 must exist together or not at all. The ETA 2004 is a sorted list, where each element is an Expandable Table Record (ETR) 2008. Each ETR 2008 identifies information about (and the location of) an Expandable Table Block (ETB) 2010 within an ETC 2006. As shown in FIG. 21, the ETR 2008 is a record containing a UEI key, a flags field, an ETB size, an ETB checksum and an ETB file address. The ETRs 2008 in the ETA 2004 are sorted based on the UEI key. The ETC 2006 is simply a binary dataset composed of a number of variable-length ETBs 2010, in any order.

To find an associated piece of VLD, a binary search is performed of the ETA 2004 for the input UEI. The UEI comparison is binary, so if any field of a subsequent input UEI is different, a different associated VLD occurrence exists. Since the ETA 2004 is ordered by UEI value, one ETS 2002 can be used to store all VLDs of all data. Where two or more VLDs are required for a single UEI, separate ETS's 2002 must be used.

As shown in FIG. 20, each ETA 2004 contains an Expandable Table Array Header (ETAH) 2012 at the top, followed by the actual ETA 2004 (list of ETRs 2008). As shown in FIG. 22, an ETAH 2012 contains: a flags field, a self-ETS UEI, an ETA size (number of ETR's) an ETA CHECKSUM field to enable verification of the ETA file upon loading an ETC size, an ETC CHECKSUM field to enable verification of the ETC file upon loading, an ETA memory address, an ETC memory address, an ETC buffer size, a current starting ETR identifier, and a current last ETR identifier.

Through usage, VLDs will come and go in a system. That is, when entities are deleted, their associated VLDs are also deleted. This would leave holes of unused space between the used ETBs 2010 of an ETC 2006. Fortunately, the process to optimize an ETS 2002 is trivial. First, a temporary ETC 2006 buffer is allocated. Then, starting from the first ETR 2008, and by keeping a current pointer, all valid ETBs 2018 are copied, back-to-back, into the temporary ETC 2006. To finish, the ETC 2010 is overwritten with the temporary ETC 2006 buffer and the temporary ETC 2010 buffer is de-allocated.

If memory is scarce, the optimization can be performed using a buffer as large as the largest ETB 2010. In such cases, ETBs 2010 would be swapped (using unused holes) until they are in a back-to-back order. Unlike the first scheme, using a single ETB 2010 buffer, the ETBs 2010 in the resultant ETC 2006 may not be ordered in the same order as the ETRs 2008.

Since a BOSS element can have an image and have associated physical data, two ETS's 2002 are used for each element. FIG. 20 also shows the minimum set 2014 of ETS's 2002 required at any level to enable BOSS VLD maintenance.

InfoFrame

FIG. 14 illustrates the components 1402 of the Information Frame (InfoFrame), which represents the highest level of logical and physical data organization in BOSS. The InfoFrame is a definition of the collection and usage of all InfoBases found at a site, and other sites that may be connected to the home site.

FIG. 23 illustrates the components of an InfoFrame Control Record (IFCR), which is contained in the InfoFrame to describe the default InfoBase processing, if any, for a site. The IFCR contains a Local Name UEI field to provide a local name for the InfoFrame known to the current site that is used as key into the IMAGE-ETS for the InfoFrame (at this site). A Flags field is used to record InfoFrame processing configurations. An SOI field recorded from the serial number of the installed EDP is used to create all UEIs generated at the current site. A Next SEI field is used to provide the next available SEI value across the current site, and this value is incremented, once read, by the EDP processes which create UEIs. A Modifiers field is used to provide operational thresholds and guidelines for the InfoFrame, wherein these modifiers are: OLDEST VALID EDS, START TIME, EDS MODIFY OCCURRENCES, STOP TIME, and EDS MODIFY FREQUENCY.

To absolutely determine when EDS's require regeneration, it would be required to examine each EDIN in each EDS, to determine all possible EDS's which that EDS is dependant upon (in some way). Clearly, this is a time consuming and an infeasible methodology to adopt. Instead, the OLDEST VALID EDS is used. This is a time scalar, indicating how old a valid EDS can be. If this is a low number, EDS's are quickly deemed invalid and in need of regeneration. If a high number, generated EDS's are deemed valid for long periods of time.

While the EDP can record occurrences when distinct changes are made to individual EDS's or SDEs, this fact is not enough to estimate when an EDS requires regeneration. For this reason, the OLDEST VALID EDS value is used.

While this number can be assigned, an End-Dynamic Operator, "DETERMINE-OLDEST-VALID", can be used at any time to automatically determine a value for this number. The START TIME, and the three modifiers EDS MODIFY OCCURRENCES, STOP TIME, and EDS MODIFY FREQUENCY, are used by the DETERMINE-OLDEST-VALID operator. When first initiated, this EDO records the START TIME, sets the EDS MODIFY OCCURRENCES to zero, and enables the RECORD MODIFY flag in the IFCR flags. This flag indicates that each subsequent EDS modification requires an increment of the EDS MODIFY OCCURRENCES modifier. Finally, this EDO prompts for a time duration, and records a STOP TIME. At the appointed stop time, the EDS MODIFY FREQUENCY is calculated based on the other assigned/accumulated modifiers. This frequency is then used to determine an estimated OLDEST VALID EDS value.

The InfoFrame also contains a Default InfoBase List (DIL), whose elements are EDINs and which comprises an EDCS. FIG. 24 shows an example DIL 2402 with three EDCLs. First, for each parameter required for an InfoBase activation, an EDIN occurs. No parameter EDINs are present if the InfoBase requires no parameters. After the parameter EDINs, the last EDIN associated with the InfoBase occurs, where the "activate InfoBase" EDO performs all tasks associated with locating and activating a particular InfoBase.

A Default Module List (DML) is used in the InfoFrame, whose elements are EDINs. The DML is an EDCS, exactly as the DIL 2402, except that the EDIN subjects are all a UEI generated for the InfoFrame DML. The InfoFrame-DML is used and loaded before the DIL 2402, and InfoBase DMLs. This enables the EDP to load native modules which may have a hand in loading and activating InfoBases.

The InfoFrame also contains an InfoBase definition List (IBDL), where each element is an IBDR. The IBDL is frequently updated to ensure any newly added InfoBases are included. The InfoFrame contains Data and Image ETS's to record such data associated directly with the InfoFrame. The InfoFrame contains an Operator Information Table (OIT), to identify and describe all Endo-Dynamic Operators. The InfoFrame contains one or more EDO program files, each containing the executable code for one or more operators. The InfoFrame contains a Parameter ETS, to describe all parameters for all EDOs. The InfoFrame contains a Bond Information Table to describe all bonds. The InfoFrame contains a Default Command List (DCL), to provide a "default dynamic program" which EDP always (and possibly continuously) executes.

InfoBase

FIG. 14 illustrates the structure of an Information Base (InfoBase), which is a conglomeration of one or more information modules. An InfoBase Definition Record (IBDR) is used to provide image and processing options for the InfoBase. An IBDR file exists for each InfoBase for import/export purposes. All regularly used IBDRs are stored on an InfoFrame basis.

As shown in FIG. 25, the IBDR is composed of: a FLAGS field to provide processing switches, a self-UEI field to uniquely identify the InfoBase, and an image-UEI field to provide a key into the InfoBase assigning an image for the InfoBase. The Flags field is identical to the one in the IFCR.

A Module Definition List (MDL) is used to provide a list of included modules in the InfoBase. Each element of the MDL is an MDR as described under module section.

A Default Module List (DML) is used for the InfoBase structured exactly as the DML stored at the InfoFrame level.

The following modules identified by the InfoBase DML are loaded and activated upon InfoBase activation. The Data and Image ETS's are used to record such data associated directly with the InfoBase.

Modules can be included in an InfoBases in two ways: shared, and exclusive. A shared module physically occurs once across all InfoBases in the current InfoFrame, but may be included in all InfoBases. In a BOSS-applied environment where concurrent processing is possible, the usual precautions and preprocessing must be applied before access is granted. An exclusive module is what all modules are by default, one that is exclusive to a particular InfoBase. An exclusive module only appears in the InfoBase it is exclusive to. While other InfoBases can access an exclusive module, any such access is regulated by the owner InfoBase.

An InfoBase can store a large amount of data and processing. In general, an InfoBase will have one or more modules containing data in one or more data organizations, and one or more modules containing programs which process that data. The modules containing programs which process that data are optional, in that the programs that process the BOSS data need not be written as BOSS programs; they could be any binary program.

Modules

FIG. 14 illustrates the structure of an Information Module (IM), which is a collection of EDINs and ETS's to record the associated images and physical data. The minimum set of required ETS's is used as described in the previous section. These ETS's store all images and data for the module as well as for all EDINs in the CNL. When saved EDS's are present, images associated with saved EDS's are also stored in these ETS's.

A Collective Node List (CNL) stores all EDINs, in arbitrary order, which together make up all the EDS's which can be generated from that module. The CNL is always loaded upon module activation. Most EDS generation operators require the specification of one or more modules to use as a source of generation; in such cases, all associated CNLs must be loaded (in turn) and used as a source for generation.

A Set Definition List (SDL) maintains a list of "saved EDS's". Each element in the SDL is a Set Definition Record (SDR). As shown in FIG. 26, each SDR contains a self-identifier UEI field identifying the EDS, a GENERATION-PROCESS UEI field, a Flags field, a LAST-GENERATION field, an EDS size field, and a memory address. The LAST-GENERATION and memory address fields are only used at runtime, after the EDP has loaded a particular module, and provide the current location and size of an EDS in memory. The GENERATION-PROCESS UEI identifies a process which will generate the EDS; this can be either an SDE, or another process. The LAST-GENERATION field is also only used at runtime; it is a date and time stamp of the last generation. This field provides a measure of how valid or up to date the EDINs pointed to by EDS address fields are. This field is compared to (current time—oldest valid eds), and if older, the associated EDS is deemed to be invalid and in need of regeneration. The SDR flags field is used to record which EDS's are temporary and which are not. Further, it identifies whether the EDS generation process is an SDE, or other process. All newly generated EDS's are by default temporary. Using EDOs, a newly generated EDS can be made permanent, or a generation process can be made to result in a permanent EDS.

When an EDS is saved to a module, only unique EDINs are added, or old EDINs updated in the CNL; EDINs are never duplicated in the CNL. Next, the EDINs which make up the equation (SDE), used to generate the EDS, are also added to/updated in the CNL. Finally, the UEI for the SDE is added to/updated in the SDL. Now, upon subsequent module loading, a client can first re-generate the SDE, then execute the SDE to regenerate a (new version of a) previously saved EDS.

When a new EDS is dynamically generated, a new unique UEI is assigned to it, and a new SDR created in the SDL. The self-identifier field of the new SDR is assigned from the newly created UEI value. All SDR flags are cleared, the last generation date is set, and the EDS size and address fields assigned from the newly generated EDS buffer. The SDE is set from the LAST-SDE global variable; this variable is cleared in each EDP cycle, and is set by the last line of any SDE. As a result, it can be used by the EDP processes to determine the associated SDE (or NULL for none).

As shown in FIG. 27, the Module Definition Record (MDR) provides a UEI for the module image (stored in the module ETS's), as well as default processing flags for a module. These are the same flags as for the IFCR and IBDR. The MDR for a module is always stored in a separate file; this file is only used when importing or exporting modules. The MDR in this file (along with all other modules used by an InfoBase) are duplicated in the Module Definition List as defined for an InfoBase. So, in reality, the MDL contains the latest version of all MDRs, and when import/export is required, the MDR file is generated and used. This is done to avoid potentially long update periods every time a module is modified in some way, and poses no problems because the MDR file is not used in regular processing; only for import/export.

A Default EDS List (DEL) is used, where each element is a UEI identifying an EDS to generate (i.e., identifying an SDE/process to execute). All default EDS's are generated upon module loading.

The IM is a self-contained package of information, providing values, images, data organization(s), data association (s), and data processing. The IM is always constructed to serve the needs of a client BOSS process. Since an EDS can always be dynamically generated from a CNL, it is possible to place incongruent or inconsistent information in the same module; although this is not recommended, it poses no problems to the BOSS environment, and values, organizations, and associations remain unaffected. Some module examples follow:

A BOSS program, where procedures, data-structure definitions, and data occurrences are recorded, and later generated as, EDS's, which are processed by either the EDP or a client BOSS program interpreter to run a program.

A BOSS menu system, where menus are recorded, and later generated as, EDS's, which are processed by the BOSS menuing client.

In general it is best to group information common to the same compound information entity in the same module. While out of context EDINs in a module do not create problems by themselves, out of context SDEs and EDINs would create potentially fatal processing problems. For example, consider an out-of-context SDE which generates an EDS for a data structure definition by default, for a module whose purpose is menuing. This would more than likely hang the menuing client. For these reasons, a BOSS client can construct SDEs which "filter" all input EDINs for consistency. Such SDEs can check for particular types and allows and disallow the input. So if the module is a menuing system, data types like "procedure" could be optionally disallowed.

Set Definition Equation (SDE)

Figure 28:
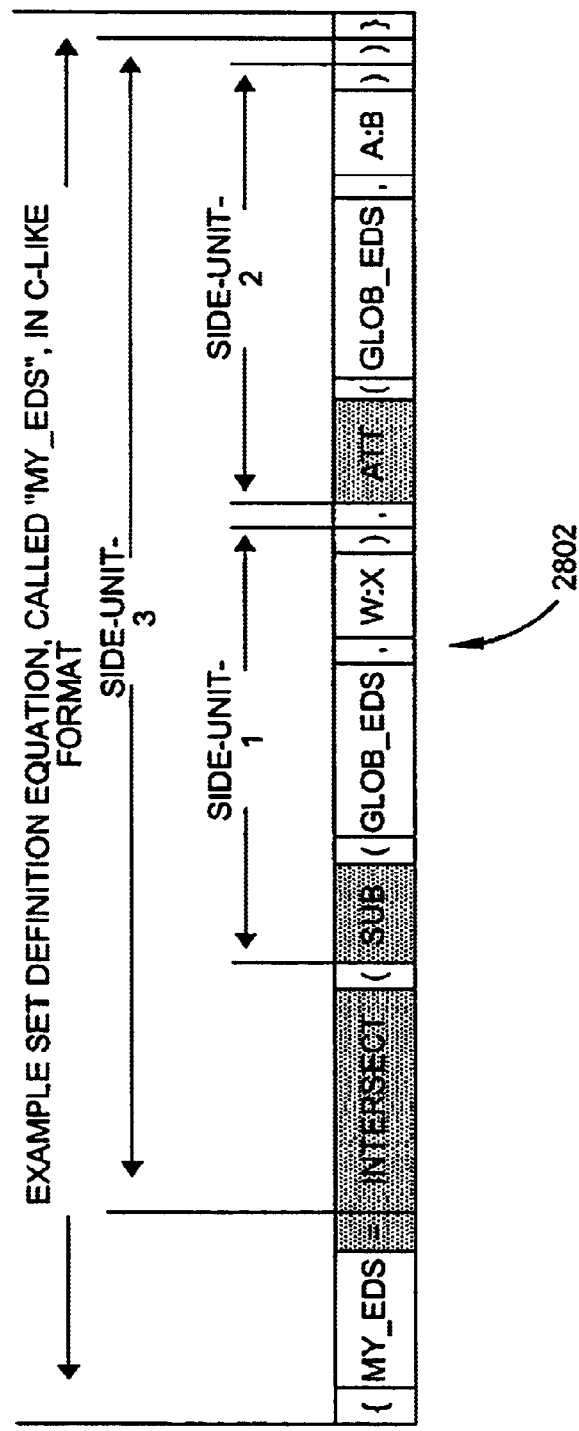
FIG. 28 is a block diagram that illustrates the structure of a Set Definition Equation according to the present invention.

As mentioned above, EDS's are based on Set Definition Equations (SDEs). An SDE is an expression composed of Endo-Dynamic Operators (EDOs) and operands. An Endo-Dynamic Operator (EDO) can be almost any kind of operator. FIG. 28 shows an example SDE 2802 with a C-like format. A new EDS called MY-EDS will be the result of resolving the right hand side of the equation. The atomic binary SDE units are shown and numbered 1, 2, and 3 from the deepest to the outermost SDE unit. The SUB, SEQ, and ATT mnemonics are EDOs that perform filtering based on different fields of the EDIN. The INTERSECT mnemonic is a logical EDO and signifies that the resultant sets of both operand expressions must be intersected. The expression shown in FIG. 28 dictates that all EDIN's in the "MY-EDS" EDS will have a Subject equal to "W:X:" and an Attribute equal to "A:B:". The "MODULE-N" module is the module used here for all operators, except INTERSECT.

The SDEs are always binary in nature. No matter how complex the equation, it can always be broken down into binary (and unary) SDE-units. As a result, an SDE is easily implemented as an EDS.

FIG. 29 shows an EDS 2902 for the SDE depicted in FIG. 28. This shows the Subject and Attribute fields of the EDIN as UEIs. This EDS 2902 also shows the Bond and sequence field values. As can be seen in FIG. 29, the SDE is simply an EDCS. In this case, these EDCLs are shown, i.e., one for each EDO showing in FIG. 28.

In this way, an EDS 2902 can be used to store equations (SDEs) which define how other EDS's are dynamically generated. The subject fields of all EDINs will always contain a unique SDE-UEI associated solely with MY EDS. The SDE by itself does not result in anything. But when the SDE is applied to an existing EDS or module, a new EDS can be generated. As a result, a single module, with multiple SDEs, can provide different dynamically generated EDS's.

Endo-Dynamic Operator (EDO)

As mentioned above, Endo-Dynamic Operators (EDOs) are to the Endo-Dynamic Processor (EDP) as instructions are to a processor. An EDO is any executable body of code requiring any number and type of parameters. While the code for most EDOs is in the form of a binary executable OS program (or procedure), EDOs expressed as EDCS's can also be created and used. As should be obvious, an EDO occurrence with all its required parameters forms a complete EDCL. So it is possible to construct an EDO and EDCL, such that the EDCL activates the EDO (via the EDP), wherein the EDO is itself an EDCS processed by the EDP. This forces the EDP to be re-entrant, where the EDP must be capable of correctly processing any number of EDCS's in as many streams of processing as initiated by various processes.

Unlike conventional "instructions", the EDO is not limited in size or complexity. The EDO can be anything from a one line procedure to a whole system (program). Further, EDOs can freely call each other without interfering with EDP process leveling or the EDP stack.

Incorrect process streams which are potentially fatal are terminated, mostly before and sometimes after a fatal process error has occurred. All stack data regarding the process (es) which were involved in a process stream resulting in the fatal error(s), can be safely and accurately removed from the EDP stack, such that pursuant EDP processing, and other existing processes can continue.

For each EDO available for use, there exists an Operator Information Record (OIR). As shown in FIG. 30, each OIR contains: an OPERATOR UEI field to provide a key in the OIT, a NUMBER OF PARAMETERS field to give the total number of input and output parameters required by the operator (the number of PDRs in the associated list), an Endo-Dynamic-Library UEI to identify the library that contains the executable code of the EDO, and a CALLING ADDRESS field to provide a memory address for the operator that is only valid at runtime after the operator's executable code has been loaded into memory. The OIRs are used at run time to verify calls to, and execute operators. As shown in FIG. 14, all OIRs are permanently maintained in the Operator Information Table (OIT), maintained at the InfoFrame level. The OIT is a sorted list, wherein a binary search locates a given OIR. The OIT is updated when EDOs are imported or modified.

To record parameter data requirements for EDOs, the PARAMETER-ETS is used. As shown in FIG. 14, this ETS is stored at the InfoFrame level. The ETRs in this ETS have EDO UEIs as the keys. The ETBs store ordered lists of records, where each record is a Parameter Definition Record (PDR). As shown in FIG. 31, a PDR contains: a Flags field to identify general I/O type of the parameter, a Data Type field to identify the required data type to internal BOSS processes, a Data Size field to give the size of the identified data type, a Type Image UEI field that identifies an image for the data type stored in the InfoFrame IMAGE-ETS and a Default Value UEI field that points to a default value occurrence for the parameter in the InfoFrame DATA-ETS (if no default value is supplied, this field contains a null UEI). Both the OIT and the Parameter ETS are used at run by the EDP to perform verified dynamic entry and execution of EDCLs.

EDO-Infobase

An Endo-Dynamic Library (EDL) is an Information Module which provides a means for transporting and storing all information regarding a given set of EDOs. All EDOs in an EDL should be related in some general way; this is often (part of) the name for the library. Note that hereafter and throughout the document and figures, "Library" is used interchangeably with "EDL".

A strictly logical entity called Endo-Dynamic Group (EDG) is used to organize all EDLs in various ways. Note that hereafter and throughout the document and figures, "Group" is used interchangeably with "EDG".

All EDLs are collected by the Endo-Dynamic Operator InfoBase (EDO-InfoBase). The EDO-InfoBase is an InfoBase like any other, but also encompassing any additional program files required by the EDLs. The EDO-InfoBase provides a way of accessing all available libraries and library information. Further, using the InfoBase DML, a certain base set of libraries are always activated (i.e., loaded and ready to be processed via EDP). The EDO-InfoBase is supplied with each EDP program/package, and is necessary for the operation of the EDP.

While the OIT and the parameter ETS provide for quick EDP processing at the top level, the bulk of the required data for the EDO processing is provided by the EDO-InfoBase. The module components as shown in FIG. 14 are used as follows for a library. A library module is no different than any other module, except that in some cases additional program files are also associated with the module.

The Module Definition Records (MDR) comprises normal module information, wherein the System flag is enabled.

The Collective Node List (CNL) stores EDINs in no particular order. As well as normal SDE recording and processing, these EDINs are used in two ways.

First, these EDINs are used to organize and specify EDOs in the library, the fields need to be set a certain way. The Subject field should contain a UEI for an EDL, or a UEI for an EDLG. The Attribute field should contain a UEI for an EDO. The Bond field should contain an "EDO Occurrence," which indicates that there is an occurrence of the EDO given by the attribute in the library given by the subject. Finally, the Sequence field is not used.

In addition, these EDINs are used to record EDOs programmed as EDCLs, all fields are set as per an EDCL. All EDINs in this CNL can be sorted by the two keys, i.e., subject and attribute, to provide an overall hierarchy of the operator groups and libraries. In addition, the CNL can be filtered for a particular subject (library or group) to generate EDS's which can be used as menus, which are then traversed, generated a new menu EDS at each traversal step. When an EDIN in library menu EDS is selected, any number of further information is available for the EDO identified by the EDIN's attribute (e.g., PDRs, image, code, etc.). The client process can then perform further processing using the EDO information.

The Image-ETS stores all images associated with all EDOs (and their parameters) in the library, as well as the image(s) for the library itself.

The Data-ETS uses a UEI key. Associated with the library (i.e., using the module UEI), is an ETB containing a list of OIRs. This provides a list of all EDOs in the library. Associated with each EDO (i.e., using the EDO UEI), is an ETB containing a list of PDRs, describing the parameters of the EDO.

The SDL identifies SDEs (stored in the CNL) to generate an EDS. For SDE-1, EDINs are sorted by the two keys: by subject and attribute to provide an overall hierarchy of operator groups and libraries.

For SDE-2, EDINs are filtered for a particular subject (library or group) to generate EDS's which can be used as menus, which are then traversed, generating a new menu EDS at each traversal step. When an EDIN in library menu EDS is selected, any number of further information is available for the EDO identified by the EDIN's attribute (e.g. PDRs, image, code, etc). The client process can then perform further processing using the EDO information.

For SDE-3, EDINs are filtered for a particular EDO subject, and sorted by the sequence. This SDE generates an EDCS executable by the EDP.

For DEL, this has one default EDS: EDS for the top-level group. This is the same as SDE-2 above, where the source subject is predefined.

If the code associated with an EDO is an EDCS, all EDINs required to make up the EDO's code body are also stored in the CNL. If the code associated with an EDO is not an EDCS (i.e., if the EDO code is some form of OS executable code body), in addition to all normal module files, an OS program file is also stored. This program file has a filename derived from the associated EDO UEI values, plus the normal OS executable extension. All such executable EDO program files are stored at the InfoFrame level.

When any library information is loaded, imported, or modified, appropriate updates are made at the InfoFrame level. After any such events, the OIT, parameter ETS, and any EDO program files are updated as required, using the just saved library data. While updating the system EDO information is a simple procedure of replacing records and files, the effects of such updates on user data containing references to the updated operators could potentially be a difficult to determine and diagnose.

Libraries and Operators

The EDP requires a minimum basic set of libraries to operate. These are:
Set Filtration Library
Control Flow Library
Physical Manipulation Library The general membership requirement(s) and a minimum set of EDOs are described for each library by the following sections. In addition to any listed EDOs, any other qualifying EDO can be added to a library. However, all such dynamically created EDOs are always tagged as "user" in the associated OIR.

When EDOs are also made into bonds (a matter of creating bond control records, since the process already exists as the EDO), a viable but limited language is realized for defining and executing BOSS programs embodied by information modules, complete with data definitions as realized by EDS's (each is an EDS in the module) and executable code as realized by EDCS's (each is an EDS in the module). The more evolved and/or complex EDOs that are introduced, the more robust such a language will become, but it will do so non-linearly. This is because any introduced EDO can call others in any (meaningful) combination that it sees fit. Each added EDO increases the number of new possibilities combinatorially.

Further, given sufficient numbers of added EDOs, any number of such dynamic programming languages are simultaneously possible, where languages can interface invisibly to any of the involved specific language processes. Any and all such languages are simply an implementation of several BOSS concepts and the specific usage of several BOSS entities disclosed in this patent.

Set Filtration Library

An EDO in this library must process EDIN list(s), based on any kind of input, to produce subsets of that EDIN list, or new EDIN list(s). The minimum required set of filter EDOs are described below. The EDOs listed below constitute the minimum required set of EDOs in the filtration library:

Union

This EDO combines two or more input EDS's into a third output EDS.

Intersection

This EDO examines two or more input EDS's for common EDINs and outputs a third EDS containing only the common EDINs.

Subject-Match
   This EDO searches the input EDS for EDINs having a match in their subject field with an input subject and returns those EDINs in a new EDS.
Attribute-Match
   This EDO searches the input EDS for EDINs having a match in their attribute field with an input attribute and returns those EDINs in a new EDS.
Bond-Match
   This EDO searches the input EDS for EDINs having a match in their bond field with an input bond and returns those EDINs in a new EDS.
Sequence-Match
   This EDO searches the input EDS for EDINs having a match in their sequence field with an input sequence and returns those EDINs in a new EDS.
Generate-Subject-Sequence
   This EDO sorts the EDINs in the input EDS by their subject field and then assigns sequence numbers to those EDINs based on their sorted order.
Remove-Nodes
   This EDO searches for and then deletes the input EDIN from the input EDS.
Descendants
   This EDO searches for any EDINs in the input EDS that are the descendant of the input EDIN.
Ancestors
   This EDO searches for any EDINs in the input EDS that are the ancestor of the input EDIN.
Siblings
   This EDO searches for any EDINs in the input EDS that are the siblings of the input EDIN.
   All of the above EDOs provide the basis for constructing SDEs to formulate and process anything from a simple database query, to data structure collection and processing, to evolved, multi-level queries where specific information is qualified to any degree and extent. Each specific application requiring filtration would introduce SDEs which use the above listed system-EDOs in various combinations with other EDOs to accomplish further specific filtrations. Any one such client procedure or program (in a client program module) can be made into a user-EDO, and incorporated into the currently known InfoFrame. Clients would create all EDOs associated with a general purpose in the same EDO-library, and add the library to the EDO-InfoBase. This makes the client supplied EDO accessible by all BOSS clients in the InfoFrame.
   In this way, flexible, dynamic, and custom-made information search engines can be built and supplied as EDOs. Such EDOs would be then used by even bigger BOSS clients such as an expert system, to unify, simplify and speed up minor information gathering and simple correlation tasks.
Control Flow Library
   An EDO in this library must be associated with process flow of the EDP, or that of a BOSS client. The following lists and describes the minimum required EDOs for this library. Although more complex control flow EDOs are possible, such EDOs would simply be "implementations" of the technology disclosed by this patent.
Push
   This EDO pushes the parameters onto the EDP stack.
Pop
   This EDO pops a value from the stack into the parameters.
Peek
   This EDO uses a stack index number to determine a stack entry from the top, and return the value stored therein into the given parameters.
Poke
   This EDO uses a stack index number to determine a stack entry from the top. Then the parameters are stored into the stack entry.
Stack-Not-Empty
   This EDO returns a true or false value dependent on the condition of the stack.
Stack-Full
   This EDO compares total stack space against currently used space and returns true or false value dependent on the condition of the stack.
Execute (Prog-UEI)
   This EDO locates, loads, and executes the binary OS program identified by the input UEI. This EDO waits for the program to terminate before returning.
Spawn (Prog-UEI)
   This EDO locates, loads, and spawns the binary OS program identified by the input UEI, as a concurrent process. This EDO does not wait for the program to terminate before returning.
Call (Prog-UEI)
   This EDO locates, loads, and executes/spawns the BOSS program identified by the input UEI. This EDO may or may not wait for the program to terminate before returning, depending on availability of concurrent processing in the environment.
Jump (CES, NP)
   This EDO sets the global variables associated with input to the input values, thereby performing an unconditional jump to another EDCL.
Jcond (Cond-UEI, CES, NP)
   This EDO performs a jump as per the jump EDO, but based on a condition. The condition is a BOSS process (sets of ordered EDCLs), which returns true or false. In most cases, the condition can be automatically generated as a SDE.
Physical Manipulation Library
   An EDO in this library must manipulate EDS's and EDINs at a physical level, where a possible input parameter for a physical EDO is a physical memory address. Some of these physical EDOs are:
Sort
   This EDO sorts the EDINs in the input EDS.
Remove-Duplicates
   This EDO removes duplicate EDINs in the input EDS.
Length
   This EDO determines the length of the input EDS.
Generate-EDS
   This EDO generates an EDS for the input EDINs.
Activate-Module
   This EDO activates the module created by the EDINs in the input EDS.
Activate-InfoBase
   This EDO activates the InfoBase created by the EDINs in the input EDS.
   The other physical EDOs are listed and described below. Mostly these EDOs are combinations of calls to other EDOs already described.
Load (WHAT)
   This EDO loads the input file into an allocated memory buffer, performing checksums, and returning the address of the allocated buffer.
Purge-Data (WHERE, DAYS)
   This EDO will irretrievably purge previously deleted BOSS data by deleting entries in trash files. The input parameter WHERE is a UEI. If the value is null, the purge will occur for all deleted data in the InfoFrame. If a non-null value, the UEI either identifies an InfoBase (find an IBDR matching the UEI) or a module (find an MDR matching the UEI). In these cases, all deleted data in the located InfoBase or module will be purged. The DAYS parameter is optional and specifies the number of days to keep deleted information.

Restore-Data (WHERE, DATA-UEI, DATE, DATE-DIRECTION, AUTO)

This EDO will retrieve previously deleted, but not purged, information. The input parameter WHERE is a UEI. If the value is null, the restore will consider all deleted data in the InfoFrame. If a non-null value, the UEI either identifies an InfoBase (find an IBDR matching the UEI) or a module (find an MDR matching the UEI). The DATA-UEI identifies the deleted data to be restored. If this value is null, all deleted data in the identified location is considered for restoration. If the DATE parameter is non-null, it is used together with the DIRECTION parameter to restore occurrences of qualifying information deleted on, before, or after a specific date. If the AUTO parameter is non-null, this EDO will make a best guess for all information restorations when duplicate deleted data is encountered. Otherwise, this EDO will prompt an operator with a choice of duplicate deleted information with different dates. The best guess is arrived at by grouping deleted data by date stamp, then restoring the set of data with the most recent date.

Get-Image (UEI)

This EDO retrieves and returns the image (or name) associated with input UEI, from an IMAGE-ETS. The search starts from current module IMAGE-ETS and expands to parent InfoBase and InfoFrame if not found at the module level.

Set-Image (UEI, IMAGE)

This EDO retrieves and returns the image (or name) associated with input UEI, from an IMAGE-ETS. The IMAGE-ETS is located in the same manner as get-image EDO. When located, the associated ETB image contents are replaced with the input IMAGE.

Create-Node (MOD-UEI, SUBJ, ATTR, BOND, SEQ)

This EDO creates a new node in the input module's CNL, using the given input parameters to set the node's fields. The sequence field can be supplied as "null" when not required. This is how information is added to BOSS at it's most primitive level. This process can be triggered from any environment, so long as the UEIs provided are valid, or will have meaning.

Delete-Node (MOD-UEI, NODE)

This EDO moves all EDINs in the CNL associated with input module, which are binary-equal to the input EDIN, NODE, to an associated trash CNL.

Create-EDS (MOD-UEI, POINTER, COUNT)

This EDO receives a memory address, POINTER, to start of a list of EDINs in (some) memory. This is NOT an active EDS at this time. Also receives a COUNT to indicate the number of EDINs in the list. This operator creates a new active EDS (not stored) containing the list of EDINs, and returns a newly assigned UEI value. This operator is useful for processes that either automatically or via user input, create EDINs from scratch. The new EDS is always added to the CNL associated with an existing module identified by input MOD-UEI.

Add-EDS (MOD-UEI, POINTER, COUNT)

This EDO receives a MOD-UEI to identify a CNL to add nodes to, as well as a memory address, POINTER, to start of a list of EDINs, and a COUNT of those EDINs. The given EDINs are then added to the identified CNL. This operator will not add binary equal EDINs which already exist in the CNL.

Copy-EDS (MOD-UEI, EDS-UEI)

This EDO makes a new EDS with the same contents as the EDS given by input EDS-UEI and returns a unique UEI to the new EDS. The new EDS is created in the module identified by the input MOD-UEI (this must exist) The EDS image remains the same.

Delete-EDS (MOD-UEI, EDS-UEI)

This EDO first generates the input EDS-UEI via generate-eds EDO, if required. Next, it calls the intersect EDO and the assigns the CNL of the input module to be the resultant "xor-eds" (i.e., the EDS containing EDINs in the CNL but not in the generated EDS). The generated EDS is then added to the associated trash CNL. Finally, the associated SDL and DEL entries matching EDS-UEI are moved to the associated trash files, if they exist.

Save-EDS (MOD-UEI, EDS-UEI)

This EDO is probably the most time and space consumptive EDO. It assumes that an EDS (EDS-UEI) was previously generated using the generate-eds EDO and then the EDINs in the memory image were modified by some client process. At this point, the memory image of the EDS needs to be updated in the module CNL to reflect any changes made by the client process. For example, consider a module containing several procedures of a program. Each EDS can then be generated from the program module on a dynamic basis. Once generated, the procedure can be dynamically modified by a programmer. Finally, the procedure is saved again in the program.

Unlike specifically deleted EDINs and data, replaced EDINs and their associated data cannot be recovered, unless steps are taken by an Endo-Dynamic Editor.

In concurrent environments, where multiple processes can access the same the module, it is best to let the currently used Endo-Dynamic Editor handle all such issues. Being dynamic, the EDE can be called by a BOSS client process to safely load, edit, and/or save EDS's in modules.

Create-Module (InfoBase-UEI, NAME, FLAGS)

This EDO creates a new module called NAME in the InfoBase given by InfoBase-UEI. This EDO first generates a new unique UEI for the new module. Then it creates an associated MDR in the InfoBase's MDL, with the newly generated module UEI. Next, all required module files (as shown in FIG. 14) are created (empty except for control). Now the input module name is inserted in the new module image ETS, by creating another new UEI for the image. The image UEI is also stored in the new MDR. Finally, the inputs FLAGS are assigned to the new MDR. The module can now be used as a source of any physical manipulation to add data, and later as a source of filtration to generate new EDS's.

Copy-Module (MOD-UEI, InfoBase-UEI, NAME)

This EDO first generates a new unique UEI for the new module. Next, all module files for module MOD-UEI are copied to files with the same extensions and the new UEI for filename. Then, a the MDR for MOD-UEI is copied into the MDL for the input InfoBase (InfoBase-UEI), and its self identifier set to the newly generated module UEI. The new module name remains unchanged if the NAME parameter is-null. If NAME is a valid image, it will be copied to the newly copied IMAG-ETC, replacing the existing value. The image UEI value need not change.

Delete-Module (InfoBase-UEI, MOD-UEI)

This EDO first appends the contents of all module files to their appropriate trash files, and then deletes all module files, as well as associated control records.

Create-InfoBase (NAME, FLAGS)

This EDO creates a new InfoBase called NAME in the currently known InfoFrame. This EDO first generates a new unique UEI for the new InfoBase. Then it creates a new IBDR in the IBDL, with the newly generated InfoBase UEI. Next, all required InfoBase files (as shown in FIG. 11) are created (empty except for control). Now the input InfoBase name is inserted in the new InfoBase image ETS, by creating another new UEI for the image. The image UEI is also stored in the new IBDR. Finally, the inputs FLAGS are assigned to the new IBDR. The InfoBase can now be used as a source of any physical manipulation to add data, and later as a source of filtration to generate new EDS's.

Copy-InfoBase (InfoBase-UEI, NAME)

This EDO first generates a new unique UEI for the new InfoBase. Next, all InfoBase files for InfoBase InfoBase-UEI are copied to files with the same extensions and the new UEI for filename; this DOES NOT include module files for all modules encompassed by the InfoBase. Then, a the IBDR for InfoBase-UEI is copied in the IBDL, where the self identifier is changed to the newly generated InfoBase UEI. Finally the new InfoBase UEI is returned. If NAME is a valid image, it will be copied to the newly copied InfoBase IMAGE-ETC, replacing the existing value. The modules are shared by InfoBases. An InfoBase encompasses modules by including MDRs for modules in its MDL.

Delete-InfoBase (InfoBase-UEI, CONTENTS)

This EDO first appends the contents of all InfoBase files to their appropriate trash files, and then deletes all InfoBase files. finally all associated control records at the InfoFrame level are trashed. If the CONTENTS parameter is non-null, all modules encompassed by the InfoBase are trashed via calls to the delete-module EDO, prior to all above steps.

Physical Storage of Boss Entities

Each of the BOSS entities described above, as well as all those shown in FIG. 14, is identified and located by a unique UEI. The identification methods have been described in the sections above. The location method is irrelevant to the BOSS technology, and any method will do, which given a UEI, can locate the physical data associated with that UEI. The following describes one such method of physical data storage and location.

Figure 32:
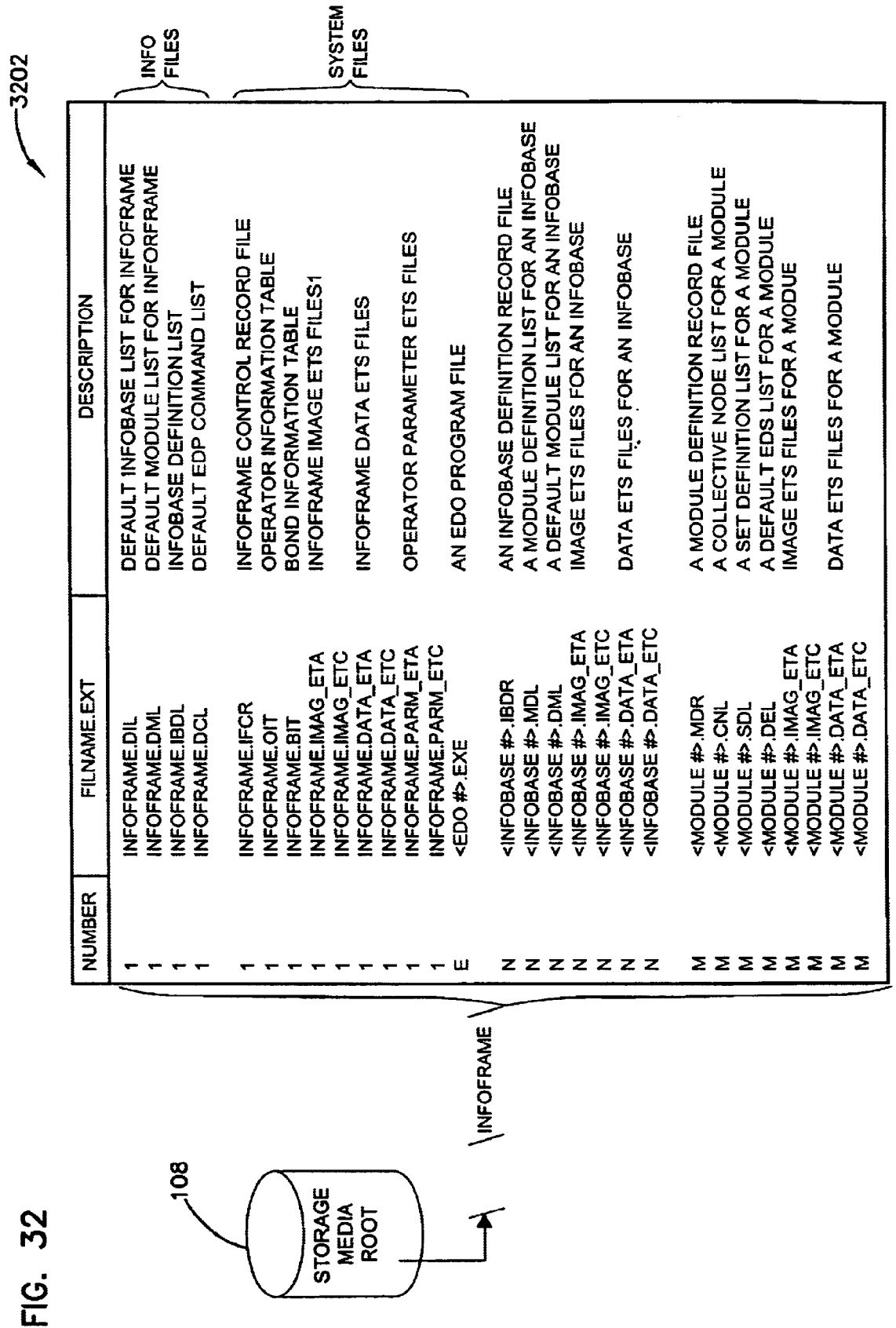
FIG. 32 is a block diagram that illustrates flat storage organization according to the present invention.

Using a conventional containment storage system (e.g. UNIX, DOS, Windows), create an InfoFrame directory in a storage media attached to the computer. The location of this directory, in the existing directory hierarchy, is recorded in the EDP program, such that when EDP is run from anywhere, it will be able to locate the directory. Further, all files shown in FIG. 14 (at all levels) are stored directly in the InfoFrame directory. This flat and simple model is depicted in FIG. 32. Two distinct file-sets are distinguishable at InfoFrame level: system and information files. System files contain those BOSS data entities which are critical to the correct operation of BOSS processes. Information files are generated as a result of information stored in BOSS format. At the InfoFrame level, there is exactly one of each file 3202 shown in FIG. 32. At the InfoBase and module levels, there are many files. In FIG. 32, the number N represents the total number of InfoBases known to the InfoFrame, the number M represents the total number of modules in all InfoBases, and the number E represents the total number of available EDO program files. Each InfoBase, module, or EDO filename is a string derived from the UEI value identifying that InfoBase, module, or EDO; this derived string is shown as "<InfoBase>", "<module>", or "<EDO>" in FIG. 32. Since UEIs are guaranteed to be unique, there is no possibility of conflicting filenames in the InfoFrame directory. Now given a UEI for an entity, all filenames for all files associated with that entity can be constructed and immediately located in the InfoFrame directory.

Looking at FIG. 32, it should be clear that the connecting link between an IBDR and the InfoBase files, and the connecting link between an MDR and the module files, is a UEI. For example, the InfoBase UEI identifier in an IBDR is used to generate the filename string associated with all files for that InfoBase.

Boss Information Deletion

When information is deleted in a BOSS environment, it is always via a physical EDO involved in data deletion/restoration. These EDOs define the methods of information deletion in BOSS. The delete-node, and delete-eds EDOs do remove information such that subsequent generations will not find the "deleted" information. However, until "deleted" data is automatically or manually purged, it can be restored. Data is purged via the purge-data EDO, or as part of automatic BOSS processing (again via purge-data), where a concurrent process is initially started upon EDP startup. This process would regularly schedule purges, based on initial user input or default values for to-purge durations. To enable this, all associated BOSS files (shown in FIG. 14) will have an associated "trash" file, where a trash file is structured as its real counterpart, where in addition to a record, a date/time stamp of deletion is also stored. For example, while the entries in a real CNL are just EDINs, a trash CNL contains records of the following structure:

EDIN

TIME STAMP

Entries are duplicated in a trash file until purged. To restore information, the restore-data EDO is used. The nature of this EDO enables manual as well as automatic data restoration, where all information links and data are also restored as before.

Default Command List

As shown in FIG. 14, the Default Command List (DCL) is an EDCS. The DCL is executed by the EDP after InfoFrame initialization is complete. If no DCL is defined, the EDP goes into an idle state, where it waits for input EDCLs. The best usage of the DCL is to implement a procedure containing an infinite loop, where the loop body activates/reactivates any systems, InfoBases, modules, and/or EDS's required to realize a continues and changing overall process. The DCL is dynamic, in that any process activated as a result of an EDCL in the DCL can alter the contents of the DCL and return. This has the effect of altering the continuous EDP process in arbitrary ways. The DCL enables the EDP to institute dynamic perpetual processing.

The InfoBase and module activation processes will insert EDCLs in the DCL, as and when required. As a result, the DCL is automatically created/modified after InfoFrame initialization is complete.

Endo-Dynamic Editor (EDE)

The BOSS environment requires at Endo-Dynamic Editor of some type. An EDE can use combinations of EDOs to perform the real BOSS data edit. An EDE can also use any kind of graphical user interface (GUI) or other input/output interface. An EDE includes means to dynamically interact with the EDP. An EDE includes means for dealing with editing EDS's, modules, and InfoBases in a an environment where concurrent or multi-processing is possible. An EDE includes means to maintain previous versions of modified data, so that data recovery is possible via the EDE. An EDE includes means to interact with the restore-data and purge-data EDOs, such that a seamless "UNDO" can be implemented as a combination of these EDOs and the data recovery means of the EDE itself. An EDE includes means for displaying in "bare mode", where all EDINs are shown and regular EDS processing is not performed, optionally including means to show regularly generated EDS's in separate windows as required. An EDE includes means for human as well as process interface, so that both a human and a process can operate the EDE.

Basic Boss Clients

These are some basic general usages of BOSS that cover several important corner stones of computing. Each model embodies a different process-view of an EDS. In each case, the storage formats and some required Bond values are assumed and given. Also in each case, an SDE is supplied if applicable.

Each general model presented may be used by any number of different real application programs. The basic boss client-models are:

Data-Traversal comprises data entry, storage, retrieval, with logical hierarchy/organization;

Structure-Definition comprises data structure definition and usage;

Program-Execution comprises program, procedure, parameter, variable, code, lines, etc., storage and usage (i.e., execution);

Analyze-Data comprises the function of deriving meaning and output any required actions given assumption data, and new input.

Note that a DB interface is different from a program execution interface only in how it processes the data. It's just a matter of perspective, on the same BOSS data (namely EDINs in various lists and orders). Even the analyze-data client can express all of its required rules and data as EDINs (and ETS data). There is a difference between the first three above listed clients, and the last. The first three are almost entirely composed of calls to EDOs to accomplish their real processing. The only processing in such clients requiring additional code (to EDO-calls), is the code required for a particular interface required by the client. All real processing can be accomplished using EDOs. This means given an operating EDP and its required initial data, these client models can be constructed almost immediately, especially in a GUI environment wherein interface construction is vastly simplified. The last client listed above requires further code (preferably BOSS executable procedures) to perform deductive, and possibly heuristic processing. Each are of these clients are described in ensuing subsections.

Data Entry, Storage and Retrieval

Many kinds of applications fall under this client-model. In fact, this encompasses any process which requires data storage, retrieval, and maintenance, where data exists in some hierarchy/organization, and where such data is then presented to a user in some depiction of the data organization. Examples of a Data-Traversal client are:

a system which maintains hierarchical data in a directory-like organization, a system which defines and processes data structure definitions, and a dynamic menu (or window) definition, traversal, processing and maintenance system.

Further, many BOSS clients will need to incorporate a Data-Traversal client (as well as other code) to automate the tasks of data storage, location, retrieval, and maintenance. Examples of this are: a system which dynamically processes (interprets) program code, and any kind of database.

Figures 33A, 33B:
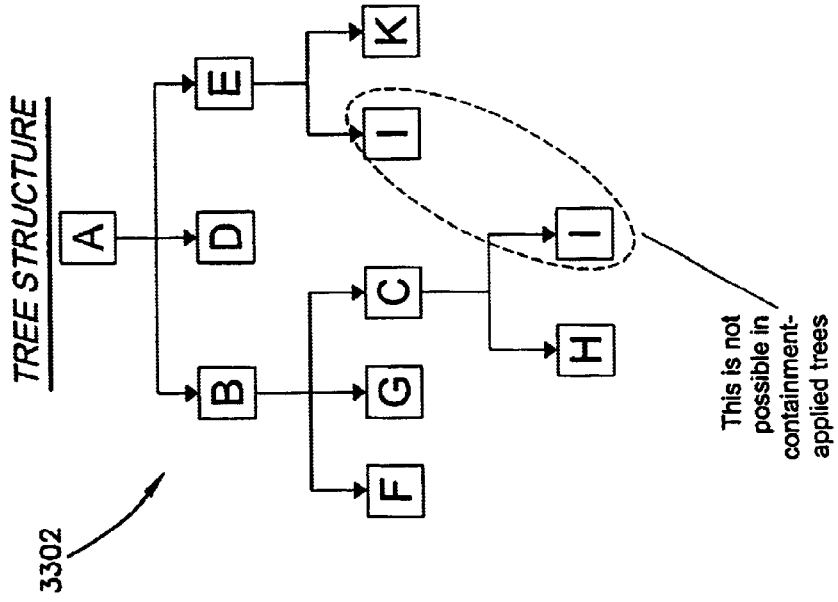
FIGS. 33A–B are a block diagram that illustrates the structure of an Endo-Dynamic Set hierarchical data tree according to the present invention.

The tree 3302 of FIG. 33A is some hierarchy of data, where, A, B, C, and E are logical entities, providing hierarchy for data entities identified by F, G, H, I, and K. This tree 3302 could be a directory tree, or a menu-tree, or any other kind of tree (a tree is hierarchical by nature). Although not shown, the data organization is not limited to trees, and any kind of graph, or other more compound data organization scheme can be used. In FIG. 33B, the leaf nodes G, H, I, K of the tree 3302 do not appear as Subjects in the EDS 3304. If a process were to filter for EDINs with Subject fields matching these IDs, the process would get an empty EDS for all of them. In fact, just such a process can be used to determine all leaf nodes in a tree-hierarchy.

Bond can be used to establish EDIN-typing, and subject-attribute relations. For example in a database, the statement: "Car55 is Crimson" can be expressed as a single EDIN, as follows:

| Source | Target | Bond | Sequence |
| --- | --- | --- | --- |
| Car55 | Crimson | is-the-colour-of | N/A |

By using SDEs, which call EDOs, simple and complex data queries can be constructed that apply to all kinds of data for any kind of BOSS client. For example, a system which maintains a directory-like data organization, would construct SDEs which will locate files and directories, while a database constructs SDEs to locate data with defined criterions and constraints.

Data Structure Definition and Usage

When adopting a method for defining data structures, usually there are two basic types: primitive (e.g. string, signed 32-bit number, etc), and compound, where a structure's elements are composed of primitives and other compounds. As described above, a BOSS defined record structure can have any kinds of elements whatsoever. This is mainly because a UEI uniquely identifies an entity anywhere. The other major factor is the already discussed interchangeability of the source and target fields in the EDIN.

Figure 34:
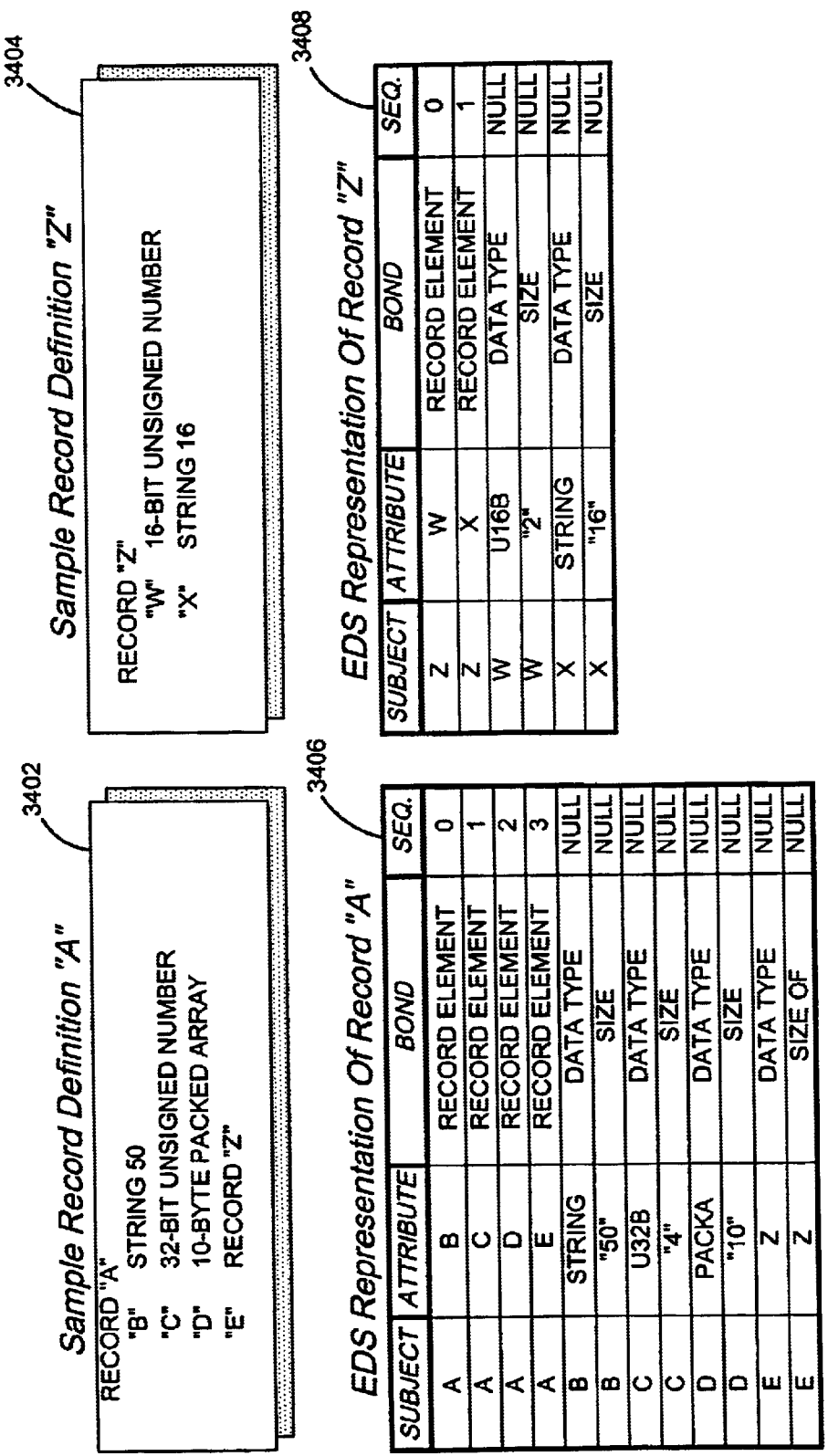
FIG. 34 is a block diagram that illustrates the structure of an Endo-Dynamic Set structure definition according to the present invention.

FIG. 34 shows an example minimal rendition of BOSS oriented data structure definition. At the top of FIG. 34, two compound records, "A" 3402 and "Z" 3404, are shown. Record "A" 3402 contains an element with data type "Z". Both compounds contain elements with primitive data types. At the bottom half of FIG. 34, the corresponding EDS's 3406 and 3408 for each record is shown. The Bond field is used to define a binary relation as in any BOSS application. The key is what those Bonds are. In this case, Bonds describe elements of data definitions, primitive/compound data types, and size.

The EDS shown for record "A" 3406 (and record "Z" 3408) would only contain all shown EDINs, if complete structure traversal is performed. That is, all Attributes of a Subject match are themselves Subject-matched, until empty sets are reached. At each step, EDINs are accumulated. Such a traversal process could be set to terminate at any level in the data hierarchy. If set to "maximum" or "all levels", the EDS 3408 shown for record "Z" would be part of the resultant EDS 3406 for record "A".

In the EDS 3406 shown for record "A", the Attributes of four EDINs with a Subject of "A" represent the four elements of record "A" 3402. The element-sequence field in these EDINs establishes the order of elements in the data structure. The rest of the EDINs describe the characteristics of each of the elements of record "A" 3402.

Now consider element "B" in record "A" 3402. This element generates a total of three EDINs: one with a Subject of "A" and Attribute of "B", and two with a Subject of "B". The first signifies "B" as an element of "A"; the next two give the data type and size of element "B". The Attribute value shown as "STRING" would be a UEI value in reality. Aside from the shown Bonds, any number of other Bond values could be implemented to provide more detailed descriptions of an element (e.g. associated process, input-coordinates, display-attributes, etc).

Aside from employing a data-traversal BOSS client, the Structure-Def BOSS client uses SDEs to dynamically construct and generate data structure definitions. When an element in a structure is created where the type is the bond "call" or "execute", it is a simple matter to construct an EDCL from all element EDINs of equal subject. The EDCL can then be executed in the normal manner. Since the EDP is capable of executing EDCLs from anywhere and at any level (limited by stack size), this enables BOSS defined data structures to contain processes which are executed when the data definition is accessed, regardless of the calling process, or any other active process.

Program Storage and Execution

Using EDINs, the EDP, and EDOs, it is possible to store, maintain, and execute any kind of program. As described above, under the EDO section, a given set of EDOs can form the instruction set for a programming language, when all such EDOs are also made available as bonds. A BOSS interpreted program can use the following EDIN implementations:

store an EDCS for each procedure, use a Structure-Def client model to store and process program data structures, or use a Data-traversal client model to save, locate and retrieve program code and data.

Since a client can also create construct and supply its own bonds and EDOs (tagged as "user"), any missing bonds/EDOs can be implemented by the client and seamlessly integrated into the BOSS environment. The new EDOs will be processed as per all EDOs, by the EDP. Further, the associated bonds can now be used to insert new code lines (EDCLs) into the interpreted program.

BOSS is ideally suited to interpreted programs, although it does support compiled programs as well. At a minimum, a BOSS oriented program must contain definitions of: data-types, variables, parameters, procedures, and lines of code. If imperative programs are required, the associated module must be tagged as "static". This indicates to the EDP that no EDS generation should take place and that the CNL should be loaded and taken for the EDS(s) in question, in some order. While interpretive programs can be directly executed by the EDP, imperative programs require a "program execution" system, program or shell which facilitates the execution of the imperative BOSS program. Such a shell would construct/establish EDCL groups for the EDP, where the last EDCL in each group returns control back to the shell, until all program processing is complete. Even using a static module, the normal control flow EDOs may not operate correctly in an imperative program. This depends on whether the operator performs a change of context or not. For example, the "edp-pop" EDO changes the next EDCL to be executed by the EDP, thereby changing the context of current processing. Such EDOs almost always cause a regeneration upon successful termination, to ensure updated data. By introducing a lot of controls in such EDOs (and complicating them), it is possible to detect an imperative process, and return the parameters of would-be context change, and it's associated action(s) to the calling process. This enables the calling process to always be in control of process flow (except for fatal errors and the like).

The program called CCOPY, shown in FIG. 35 as 3502, performs a Conditional Copy. It has two parameters, and two variables. It also has one procedure which is not shown; only called. The parameters of CCOPY are two UEIs to two distinct files: Source File (SFILE) and Target File (TFILE). First, the program 3502 gets the current date of each input file and stores the dates in SDATE and TDATE. This is accomplished by calls to the GET-DATE program procedure. This procedure is not shown, but it should be easy enough to picture it as an OS call. Finally, the program 3502 compares the two dates and if the source file date is greater than that of the target file, it copies the source file, overwriting the target file. Both the "if" and "copy" are accomplished by OS or shell calls (i.e., native to BOSS interface).

The EDS 3602 shown on FIG. 36 depicts the required EDINs 3604 to define and be able to execute, the CCOPY program. The sequence field establishes an order, where a set of EDCLs are realized. To further define a parameter or variable, the same methodology as for a Structure-Def client is used. For example, to define the SFILE parameter, the following two EDINs 3604 could be added to the program module CNL:

| Subject | Attribute | Bond | Sequence |
|---------|-----------|-----------|----------|
| SFILE | STRING | DATA TYPE | NULL |
| SFILE | "256" | SIZE | NULL |

The SDEs can be used to dynamically generate components of the program, from the CNL. As a result, all program components remain dynamic. So if a data structure changes, the processes using that structure, or data in that structure, will immediately experience the effects of the change. As with any dynamic interpreted program, sufficient safeguards must be taken to enure only changes without destructive effects take place.

Conclusion

This concludes the description of the preferred embodiment of the invention. In summary, The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

TABLE I

| NUMBER OF MODULES | TOTAL REAL POSSIBILITIES | INCREASE IN POSSIBILITIES |
|---|---|---|
| 1 | | |
| 2 | 0.50 | 0.25 |
| 5 | 30 | 30 |
| 10 | 907,200 | 907,170 |
| 100 | 2e+157 | 2e+157 |

What is claimed is:

1. A computer-implemented method for processing data, the method comprising:

accessing an information structure, the information structure comprising one or more associations of data, wherein at least one association comprises a first item associated with a subject, a second item associated with an attribute, and a third item associated with a bond, wherein the bond defines a relationship between the subject and the attribute;

applying a condition to the information structure to identify a subset of the associations of data satisfying the condition; and dynamically generating a data structure defined according to the subset.

2. The method according to claim 1, wherein at least one association comprises at least one item associated with a remote site of a multi-site computer environment.

3. The method according to claim 2, wherein the at least one item involves a universal identifier to identifier the location of an associated resource located at the remote site.

4. The method according to claim 3, wherein the universal identifier corresponds to a Universal Entity Identifier.

5. The method according to claim 1, wherein the condition applied to the information structure comprises a set definition equation.

6. The method according to claim 5, wherein set definition equation comprises a union operation.

7. The method according to claim 5, wherein the set definition equation comprises one or more set definition operators, the set definition operators include set filtration operators, control flow operators, and physical manipulation operators.

8. The method according to claim wherein the set filtration operators comprise union, intersection, subject-match, attribute-match, bond-match, sequence match, generate-subject-match, remove node, descendants, ancestors, and siblings.

9. The method according to claim 7, wherein the control flow operators comprise push, pop, peek, poke, stack-not-empty, stack-full, execute, spawn, call, jump, and jump-conditional.

10. The method according to claim 7, wherein the physical manipulation operators comprise sort, remove-duplicates, length, generate-data-set, activate module, load-data, purge-data, restore-data, get-image, set-image, create-node, delete-node, create-data-set, add-data-set, copy-data-set, delete-data-set, and save-data-set.

11. The method according to claim 5, wherein the method further comprises identifying a relationship between two or more associations of data by traversing the data structure corresponding to the subset of associations of data.

12. The method according to claim 11, wherein the data structure corresponding to the subset of associations of data is information structure.

13. The method according to claim 5, wherein the set definition equation comprising applying an order-specific set of set definition operators.

14. A computer-readable storage medium readable by a computing system and encoding a computer program of instructions for executing a computer process performing the method recited in claim 1.

15. A computer-implemented method for generating a data organization, the method comprising:

accessing a first data set, the data set comprising a first set of one or more associations, wherein at least one association comprises a first item associated with a subject, a second item associated with an attribute, and a third item associated with a bond, wherein the bond defines a relationship between the subject and the attribute;

accessing a second data set, the data set comprising a second set of one or more associations, wherein at least one association comprises a first item associated with a subject, a second item associated with an attribute, and a third item associated with a bond, wherein the bond defines a relationship between the subject and the attribute;

combining the first and the second data sets to dynamically generating a customized data set.

16. The method according to claim 15, wherein at least one association in the first data set comprises at least one item associated with a local site of a multi-site computer environment, and at least one association in the second data set comprises at least one item associated with a remote site of a multi-site computer environment.

17. The method according to claim 16, wherein the at least one association in the first data set item involves a universal identifier to identify the location of an associated resource located at the remote site.

18. The method according to claim 17, wherein the universal identifier corresponds to a Universal Entity Identifier (UEI).

19. The method according to claim 15, wherein at least one association in the first data set comprises at least one item associated with a local site of a multi-site computer environment, and the second data set corresponds to a remote operations list located at the remote site.

20. The method according to claim 19, wherein the at least one association in the first data set item involves a universal identifier to identify the location of an associated resource located at the remote site.

21. The method according to claim 20, wherein the universal identifier corresponds to a Universal Entity Identifier (UEI).

22. The method according to claim 15, wherein the condition applied to the information structure comprises a set definition equation.

23. The method according to claim 22, wherein the combining the first and the second data sets uses a condition applied to the first and the second data sets.

24. The method according to claim 23, wherein
the condition comprises a set definition equation comprising one or more set definition operators, and
the set definition operators include set filtration operators, control flow operators, and physical manipulation operators.

25. The method according to claim 24, wherein the set filtration operators comprise union, intersection, subject-match, attribute-match, and bond-match.

26. The method according to claim 25, wherein the set filtration operators further comprise sequence match, generate-subject-match, and remove node.

27. The method according to claim 24, wherein the set filtration operators further comprise descendants, ancestors, and siblings.

28. The method according to claim 24, wherein the control flow operators comprise push, pop, peek, poke, stack-not-empty, stack-full, jump, and jump-conditional.

29. The method according to claim 28, wherein the control flow operators further comprise execute, spawn, and call.

30. The method according to claim 24, wherein the physical manipulation operators comprise remove-duplicates, length, activate module, load-data, purge-data, restore-data, get-image, set-image, create-node, delete-node, create-data-set, add-data-set, copy-data-set, delete-data-set, and save-data-set.

31. The method according to claim 24, wherein the physical manipulation operators comprise sort, create-node, and delete-node.

32. The method according to claim 31, wherein the physical manipulation operators further comprise generate-data-set, create-data-set, add-data-set, copy-data-set, and save-data-set.

33. The method according to claim 32, wherein the physical manipulation operators further comprise purge-data, delete-data-set, and remove-duplicates.

34. The method according to claim 23, wherein the method further comprises identifying a relationship between two or more associations of data by traversing the data structure corresponding to the subset of associations of data.

35. The method according to claim 23, wherein the set definition equation comprising applying an order-specific set of set definition operators.

36. The method according to claim 22, wherein the set definition equation comprises a union operation applied to the first and second data sets.

37. A computer-readable storage medium readable by a computing system and encoding a computer program of instructions for executing a computer process performing the method recited in claim 15.

38. A method for determining a relationship between a plurality of data items stored within a memory of a computing system, the method comprising:
  accessing at least one data item stored within a traversable information structure, the traversable information structure comprising one or more associations, wherein at least one association comprises a first item associated with a subject, a second item associated with an attribute, and a third item associated with a bond, wherein the bond defines a relationship between the subject and the attribute;
  applying a condition to the data items for determining whether to include the data items in a dynamically generated subset of data items;
  traversing the generated subset of data items using the traversable information structure to determine relationships between two or more data items.

39. The method according to claim 38, wherein at least one association comprises at least one item associated with a remote site of a multi-site computer environment.

40. The method according to claim 38, wherein the at least one item involves a universal identifier to identify the location of an associated resource located at the remote site.

41. The method according to claim 40, wherein the universal identifier corresponds to a Universal Entity Identifier (UEI).

42. The method according to claim 38, wherein the step of traversing results in accessing a resource on the located at the remote site.

43. The method according to claim 42, wherein the at least one item involves a universal identifier to identify the location of an associated resource located at the remote site.

44. The method according to claim 43, wherein the universal identifier corresponds to a Universal Entity Identifier (UEI).

45. The method according to claim 38, wherein the data structure corresponding to the subset of associations of data is information structure.

46. The method according to claim 38, wherein the set definition equation comprising applying an order-specific set of set definition operators.

47. The method according to claim 38, wherein the condition applied to the information structure comprises a set definition equation.

48. The method according to claim 47, wherein the set definition equation comprises a union operation.

49. The method according to claim 47, wherein the set definition equation comprises one or more set definition operators, the set definition operators include set filtration operators, control flow operators, and physical manipulation operators.

50. The method according to claim 49, wherein the set filtration operators comprise union, intersection, subject-match, attribute-match, bond-match, sequence match, generate-subject-match, remove node, descendants, ancestors, and siblings.

51. The method according to claim 49, wherein the control flow operators comprise push, pop, peek, poke, stack-not-empty, stack-full, execute, spawn, call, jump, and jump-conditional.

52. The method according to claim 49, wherein the physical manipulation operators comprise sort, remove-duplicates, length, generate-data-set, activate module, load-data, purge-data, restore-data, get-image, set-image, create-node, delete-node, create-data-set, add-data-set, copy-data-set, delete-data-set, and save-data-set.

53. A computer-readable storage medium readable by a computing system and encoding a computer program of instructions for executing a computer process performing the method recited in claim 38.

54. A method for determining a relationship between a plurality of information atoms stored within a memory of a computing system, the method comprising:
  accessing at least one information atom stored within a traversable information structure, the traversable information structure being related to one or more associations, wherein at least one association comprises a first item associated with a subject, a second item associated with an attribute, and a third item associated with a bond, wherein the bond defines a relationship between the subject and the attribute; and
  applying a condition to at least one information atom for dynamically generating a subset of data items to which the relationship applies;
  wherein the applying involves traversing the information structure to identify the subset.

55. A computer-readable storage medium readable by a computing system and encoding a computer program of instructions for executing a computer process performing the method recited in claim 54.

56. A method for identifying an association, the method comprising:
  traversing an information structure, the information structure being related to one or more associations, wherein at least one association comprises a first item associated with a subject, a second item associated with an attribute, and a third item associated with a bond, wherein the bond defines a relationship between the subject and the attribute; and
  finding a candidate assertion based on said step of traversing, the candidate assertion being a dynamically generated information structure related to one or more associations;
  applying one or more conditions to the associations to determine whether the candidate association meets the one or more conditions; and
  selectively identifying the candidate assertion as meeting the one or more conditions.

57. The method according to claim 56, wherein the condition applied to the information structure comprises a set definition equation.

58. The method according to claim 57, wherein the set definition equation comprises a union operation.

59. The method according to claim 56, wherein at least one association comprises at least one item associated with a remote site of a multi-site computer environment.

60. The method according to claim 59, wherein the at least one item involves a universal identifier to identify the location of an associated resource located at the remote site.

61. The method according to claim 60, wherein the universal identifier corresponds to a Universal Entity Identifier (UEI).

62. The method according to claim 56, wherein the step of traversing results in accessing a resource on the located at the remote site.

63. The method according to claim 62, wherein the at least one item involves a universal identifier to identify the location of an associated resource located at the remote site.

64. The method according to claim 63, wherein the universal identifier corresponds to a Universal Entity Identifier (UEI).

65. The method according to claim 56, wherein the information structure comprises the one or more associations.

66. The method according to claim 56, wherein the information structure is dynamically generated from the one or more associations and the information structure is thereby related to the one or more associations.

67. A computer-readable storage medium readable by a computing system and encoding a computer program of instructions for executing a computer process performing the method recited in claim 56.

68. A method for determining a relationship between a plurality of information atoms stored within a memory of a computing system, the method comprising:

accessing at least one information atom stored within a traversable information structure, the traversable information structure having been dynamically generated from one or more associations, wherein at least one association comprises a first item associated with a subject, a second item associated with an attribute, and a third item associated with a bond, wherein the bond defines a relationship between the subject and the attribute; and applying a condition to at least one information atom for determining a subset of data items to which the relationship applies;

wherein the applying involves traversing the information structure to identify the subset.

69. The method of 68, wherein said information atom corresponds to a subject of an association.

70. The method of 68, wherein said information atom corresponds to an attribute of an association.

71. The method according to claim 68, wherein the condition applied to the information structure comprises a set definition equation.

72. The method according to claim 71, wherein the set definition equation comprises a union operation.

73. The method according to claim 68, wherein at least one association comprises at least one item associated with a remote site of a multi-site computer environment.

74. The method according to claim 73, wherein the at least one item involves a universal identifier to identify the location of an associated resource located at the remote site.

75. The method according to claim 74, wherein the universal identifier corresponds to a Universal Entity Identifier (UEI).

76. The method according to claim 68, wherein the step of traversing results in accessing a resource on the located at the remote site.

77. The method according to claim 68, wherein the at least one item involves a universal identifier to identify the location of an associated resource located at the remote site.

78. The method according to claim 68, wherein the universal identifier corresponds to a Universal Entity Identifier (UEI).

79. A computer-readable storage medium readable by a computing system and encoding a computer program of instructions for executing a computer process performing the method recited in claim 68.

80. For use in a multi-site computer networked distributed processing environment, a computer-implemented method for generating a data organization, the method comprising:

accessing a first data set, the data set comprising a first set of one or more associations, wherein at least one association comprises a first item associated with a subject, a second item associated with an attribute, and a third item associated with a bond, wherein the bond defines a relationship between the subject and the attribute;

determining a reference in at least one of the items, the reference identifying a remote site in a multi-site computer system; and accessing a second data set, the data set being located at least partially at the remote site, the second data set comprising a second set of one or more associations, wherein at least one association comprises a first item associated with a subject a second item associated with an attribute, and a third item associated with a bond, wherein the bond defines a relationship between the subject and the attribute;

wherein the accessing the first data set and the accessing the second data set steps dynamically generates a new data set of one or more associations.

81. The method according to claim 80, wherein the at least one item involves a universal identifier to identify the location of an associated resource located at the remote site.

82. The method according to claim 81, wherein the universal identifier corresponds to a Universal Entity Identifier (UEI).

83. The method of claim 80, further comprising the step of combining the first and the second data sets to provide a customized data set.

84. The method according to claim 83, wherein the at least one item involves a universal identifier to identify the location of an associated resource located at the remote site.

85. The method according to claim 84, wherein the universal identifier corresponds to a Universal Entity Identifier (UEI).

86. A computer-readable storage medium readable by a computing system and encoding a computer program of instructions for executing a computer process performing the method recited in claim 80.

* * * * *

UNITED STATES PATENT AND TRADEMARK OFFICE
CERTIFICATE OF CORRECTION

PATENT NO. : 6,636,865 B2  Page 1 of 1
DATED : October 21, 2003
INVENTOR(S) : Ahmadi It is certified that error appears in the above-identified patent and that said Letters Patent is hereby corrected as shown below:

Title page,
Item [63], Related U.S. Application Data, "Continuation of application No. 09/477,078, filed on Jan. 3, 2000, now Pat. No. 6,470,351, which is a continuation of application No. 09/215,381, filed on Dec. 18, 1998, now Pat. No. 6,092,077, which is a continuation of application No. 08/924,706 filed on Sep. 5, 1997, now abandoned." should read:
-- Continuation of application No. 09/477,078, filed on Jan. 3, 2000, now Pat. No. 6,470,351, which is a continuation of application No. 09/215,381, filed on Dec. 18, 1998, now Pat. No. 6,092,077, which is a continuation of application No. 08/924,706 filed on Sep. 5, 1997, now abandoned, which is a continuation of application No. 08/356,878 filed on Dec. 15, 1994, now Pat. No. 5,684,985. --

Column 1,
Line 9, after the words "now abandoned," please insert the following -- which is a continuation of application Ser. No. 08/356,878 filed Dec. 15, 1994, now U.S. Pat. No. 5,684,985, --

Signed and Sealed this

Fourteenth Day of December, 2004

JON W. DUDAS
*Director of the United States Patent and Trademark Office*